United States Patent
Naito et al.

(10) Patent No.: US 9,287,751 B2
(45) Date of Patent: Mar. 15, 2016

(54) ELECTRIC CUTTING OR DRILLING TOOLS THAT USE BATTERY PACKS AS POWER SOURCES

(71) Applicant: MAKITA CORPORATION, Anjo-shi, Aichi (JP)

(72) Inventors: Tsutomu Naito, Anjo (JP); Hirotomo Inayoshi, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 255 days.

(21) Appl. No.: 14/022,995

(22) Filed: Sep. 10, 2013

(65) Prior Publication Data

US 2014/0084718 A1    Mar. 27, 2014

(30) Foreign Application Priority Data

Sep. 26, 2012 (JP) ................. 2012-212332
Jul. 16, 2013 (JP) ................. 2013-147541

(51) Int. Cl.
| | |
|---|---|
| *B23D 47/00* | (2006.01) |
| *B25F 5/00* | (2006.01) |
| *B26B 25/00* | (2006.01) |
| *H02K 7/14* | (2006.01) |

(52) U.S. Cl.
CPC ............. *H02K 7/145* (2013.01); *B23D 47/00* (2013.01); *B25F 5/008* (2013.01); *B26B 25/00* (2013.01)

(58) Field of Classification Search
CPC ..... H02K 9/06; H02K 11/0057; B23D 47/00; B25F 5/008; B26B 25/00
USPC .......... 310/50, 52, 62, 68 C; 361/31, 33, 695; 173/217; 83/801
See application file for complete search history.

(56) References Cited

U.S. PATENT DOCUMENTS

| | | |
|---|---|---|
| 7,768,750 B2 * | 8/2010 | Uchida ........................... 361/31 |
| 7,969,116 B2 * | 6/2011 | Aradachi et al. .............. 320/114 |
| 2006/0255756 A1 | 11/2006 | Iwata et al. |
| 2010/0253162 A1 * | 10/2010 | Sakamaki et al. .............. 310/50 |
| 2011/0180286 A1 * | 7/2011 | Oomori et al. .................. 173/20 |
| 2011/0214302 A1 | 9/2011 | Inayoshi |
| 2012/0000755 A1 | 1/2012 | Kumagai et al. |

FOREIGN PATENT DOCUMENTS

| | | |
|---|---|---|
| CN | 1945936 A | 4/2007 |
| CN | 102189293 A | 9/2011 |
| CN | 102341219 A | 2/2012 |
| DE | 3837158 A1 | 5/1989 |
| JP | A-61-8289 | 1/1986 |
| JP | 11-129169 | 5/1999 |

(Continued)

OTHER PUBLICATIONS

Jun. 24, 2015 Office Action issued in Chinese Patent Application No. 201310451405.2.

*Primary Examiner* — Thomas Truong
*Assistant Examiner* — Minki Chang
(74) *Attorney, Agent, or Firm* — Oliff PLC

(57) ABSTRACT

An electric tool may include a tool main body configured to be able to mount a battery pack. The tool main body may include an electric motor, a controller for controlling the electric motor, and a centrifugal fan rotatably driven by the electric motor for producing a flow of air. The controller may be positioned such that the flow of air produced by the centrifugal fan is applied to at least a part of the controller.

9 Claims, 15 Drawing Sheets

(56) References Cited

FOREIGN PATENT DOCUMENTS

| JP | A-11-129169 | 5/1999 |
| JP | 2007-21997 | 2/2007 |
| JP | A-2007-21997 | 2/2007 |
| JP | 2008-18498 | 1/2008 |
| JP | A-2008-18498 | 1/2008 |
| JP | 2010-201598 | 9/2010 |
| JP | A-2010-201598 | 9/2010 |
| JP | 2011-183466 | 9/2011 |
| JP | A-2011-183466 | 9/2011 |

* cited by examiner

ELECTRIC CUTTING OR DRILLING TOOLS THAT USE BATTERY PACKS AS POWER SOURCES

This application claims priority to Japanese patent application serial numbers 2012-212332 and 2013-147541, the contents of which are incorporated herein by reference.

BACKGROUND OF THE INVENTION

1. Field of the Invention

Embodiments of the present invention relate to electric tools and, more specifically, to electric tools such as electric cutting tools and electric drilling tools that use battery packs as power sources (DC power sources).

2. Description of the Related Art

Japanese Laid-Open Patent Publication Nos. 2010-201598, 2008-18498 and 61-8289 disclose techniques relating to a cutting tool that uses a battery pack as the power source. The cutting tool may be a portable circular saw that includes a base for contacting with the upper surface of a workpiece, and a tool main body supported on the upper side of the base. The tool main body may include a circular saw blade, an electric motor for rotating the saw blade, and a handle portion that can be grasped by the user for moving the portable circular saw. As disclosed in the above-mentioned publications, the battery pack may be repeatedly used by being recharged by a charger separately prepared. In general, this kind of electric tool may be held by hand while being used. Therefore, various improvements have been made for this type of electric tool for securing visibility of the workpiece to be machined, securing operability during the machining operation, and configuring the size to be small.

The electric tool may include a controller that can automatically stop the supply of the electric power to the motor under a predetermined condition. For example, the controller may forcibly stop the supply of the electric power to the motor when the battery pack is in an over-discharge state or when the motor is in an over-current state. Such over-discharge state and over-current state are factors leading to a short service life of the battery pack. Thus, in an electric tool to which a battery pack is mounted, it is desirable to avoid the over-discharge state and the over-current state as much as possible. In the case that the controller is used for a brushless motor, the controller must have a relatively large size. On the other hand, due to its nature as a controller, the controller may generate heat. Therefore, it is desirable that the electric tool is designed by taking the cooling of the controller into consideration.

Therefore, there has been a need in the art for securing the cooling of a controller of an electric tool while achieving a reduction in the size of the electric tool.

SUMMARY OF THE INVENTION

In one aspect according to the present teachings, an electric tool may include a tool main body configured to be able to mount a battery pack. The tool main body may include an electric motor, a controller for controlling the electric motor, and a centrifugal fan rotatably driven by the electric motor for producing a flow of air. The controller may be positioned such that the flow of air produced by the centrifugal fan is applied to at least a part of the controller.

DETAILED DESCRIPTION OF THE INVENTION

Figure 1:
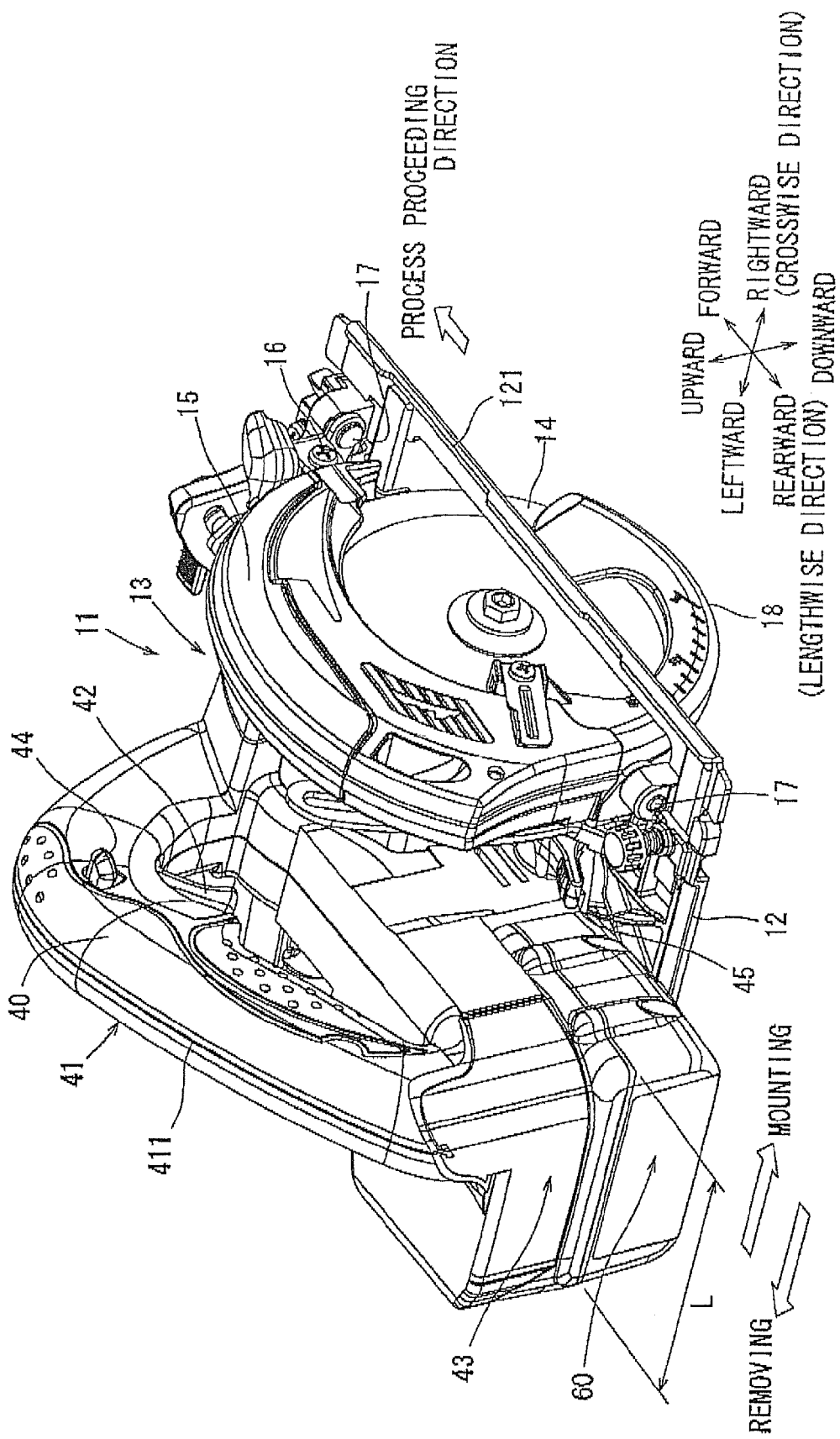
FIG. 1 is a perspective view, as seen obliquely from the right rear side, of a cutting tool according to a reference embodiment.

Each of the additional features and teachings disclosed above and below may be utilized separately or in conjunction with other features and teachings to provide improved electric tools. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one embodiment, an electric tool may include a tool main body configured to be able to mount a battery pack. The tool main body may include an electric motor configured to rotate with a supply of an electric power from the battery pack, a centrifugal fan rotatably driven by the electric motor for producing a flow of air, and a controller configured to control the electric motor with respect to a rotational drive of the electric motor. The controller may be disposed within the tool main body such that at least a part of a surface of the controller is positioned on an outer side in a centrifugal direction of the centrifugal fan. The surface of the controller may be a longer-side surface.

With this arrangement, it is possible to apply the exhaust air blown out from the centrifugal fan to the surface of the controller, making it possible to achieve the effect of cooling the controller by this exhaust air. Thus, by utilizing the centrifugal fan, it is possible to achieve a reduction in the size of the electric tool while making it possible to secure the cooling of the controller.

The electric tool may be a hand-held electric tool, and the tool main body may further include a handle portion configured to be grasped by a user, so that the electric tool can be operated while the user supports the electric tool by grasping the handle portion during a cutting operation.

The controller may be positioned on a rear side of the electric motor with respect to a machining proceeding direction. With this arrangement, it is possible to achieve a reduction in size in the tool machining proceeding direction. As a result, the machining operation by using the electric tool can be easily made.

The controller may be fixed in position within the tool main body with a shorter side surface of the controller being positioned to extend along a tool machining proceeding direction. With this arrangement, it is possible to reduce the size of the controller in a direction along the tool machining proceeding direction. As a result, the machining operation by using the electric tool can be further easily made.

REFERENCE EMBODIMENT

Before the explanation of first to third embodiments, a reference embodiment will be described with reference to FIGS. 1 through 6. Except for the specific features of the first embodiment that will be described later, the features of the reference embodiment described below may be generally incorporated into the first embodiment. In the reference embodiment, a cutting tool 11 is configured as a so-called portable circular saw that is an example of a cutting tool. This cutting tool 11 may be provided with a rectangular base 12 for contacting with the upper surface of a workplace (not shown), and a tool main body 13 supported on the upper side of the base 12. A sub base 121 may be detachably mounted to the right side portion of the base 12. The sub base 121 may be detached for performing a so-called "edge-cutting." In describing the cutting tool 11 according to the reference embodiment, the side toward which the machining operation by the cutting tool 11 proceeds will be referred to as the front side.

The tool main body 13 may include a blade case 15 that covers substantially the upper half of a circular saw blade 14. An electric motor 21 may be mounted to the rear side (the left side) of the blade case 15 via a speed reduction gear section 30. The saw blade 14 serves as a machining tool in this embodiment.

The lower portion of the saw blade 14 may protrude downwardly from the base 12. This protruding portion may cut into the workpiece for cutting the workpiece. The lower portion of the saw blade 14 may be covered with a movable cover 18. The movable cover 18 may be rotatably supported by the blade case 15.

The tool main body 13 may be supported so as to be vertically tiltable relative to the base 12 via a vertical tilting support shaft 16 that is rotatably supported by the front portion of the upper surface of the base 12. By adjusting the vertical tilting position of the tool main body 13, it is possible to adjust the protruding distance of the saw blade 14 from the lower surface of the base 12, i.e., the cutting depth of the saw blade 14 into the workpiece. On the backside of the blade case 15 and on the rear side of the speed reduction gear section 30, a cutting depth fixing lever 45 may be provided for fixing the vertical tilting position of the tool main body 13.

Further, the tool main body 13 may be supported so as to be tiltable in the left and right direction relative to the base 12 via horizontal tilting support shafts 17 that are rotatably supported by the upper surface of the base 12 and have the same axis.

The tool main body 13 may be provided with a handle portion 41 that can be grasped by the user. The handle portion 41 extends rearwards in a chevron-shape from the upper portion of the speed reduction gear section 30. The handle portion 41 may have a two-part structure and may include right and left pieces that are joined together at a joint plane 411. The handle portion 41 may include a handle housing 40 having a hollow structure.

A trigger type switch lever 42 may be provided on the lower surface of the handle portion 41. The switch lever 42 can be pulled by a fingertip of the grasping hand of the user. When the switch lever 42 is pulled, the electric motor 21 starts to rotate the saw blade 14. Above the switch lever 42 and on the right and left sides of the handle portion 41, there are provided lock-off levers 44 for locking the switch lever 42 at the OFF position.

At the rear portion of the handle portion 41, there is provided a battery mounting portion 43 for mounting a battery pack 60 serving as the power source of the cutting tool 11. The battery pack 60 can be mounted and removed as it is slide in the left and right direction (the lateral direction) relative to the battery mounting portion 43.

Figure 5:
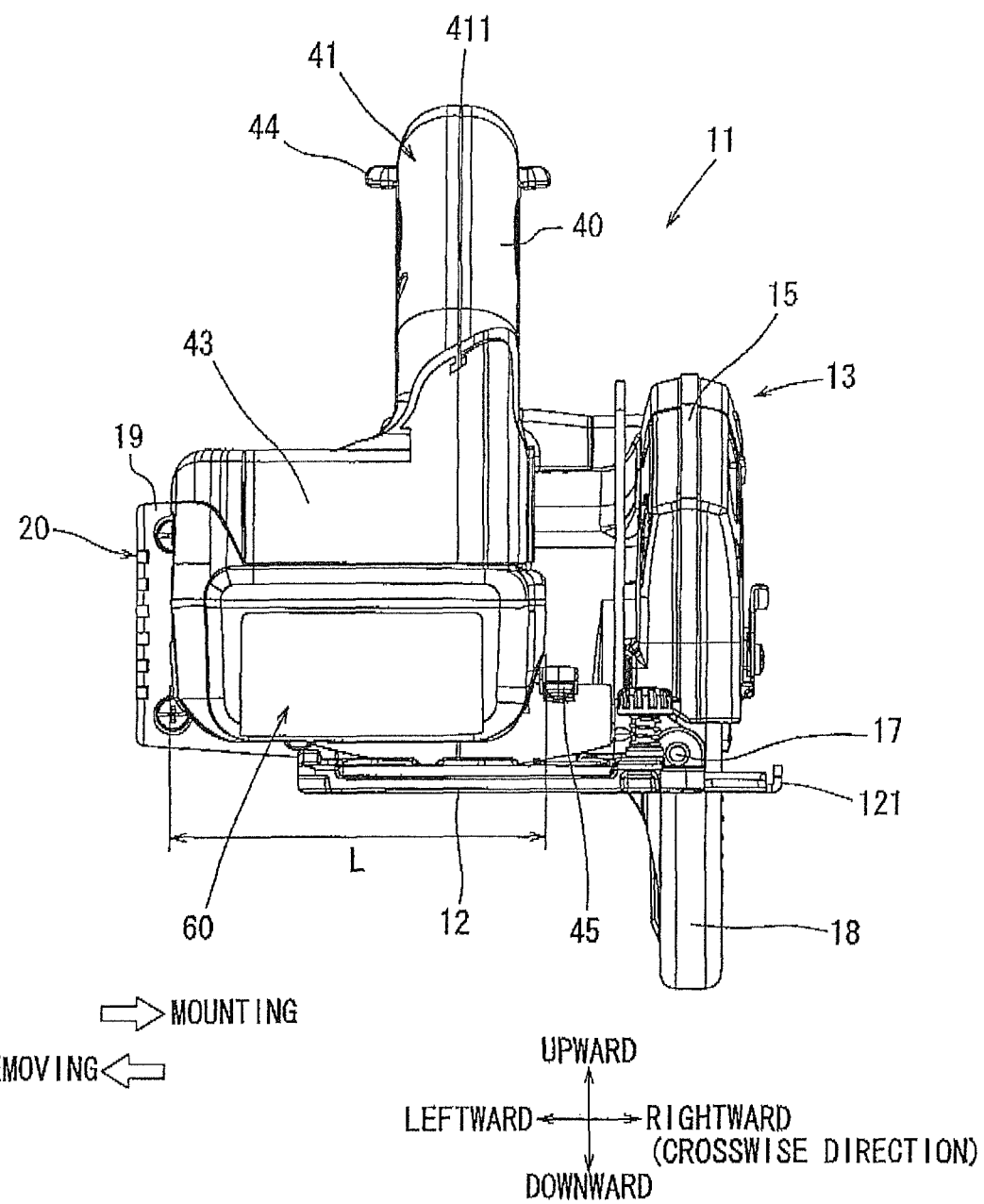
FIG. 5 is a rear view of the cutting tool, with the battery pack mounted thereto.
Figure 6:
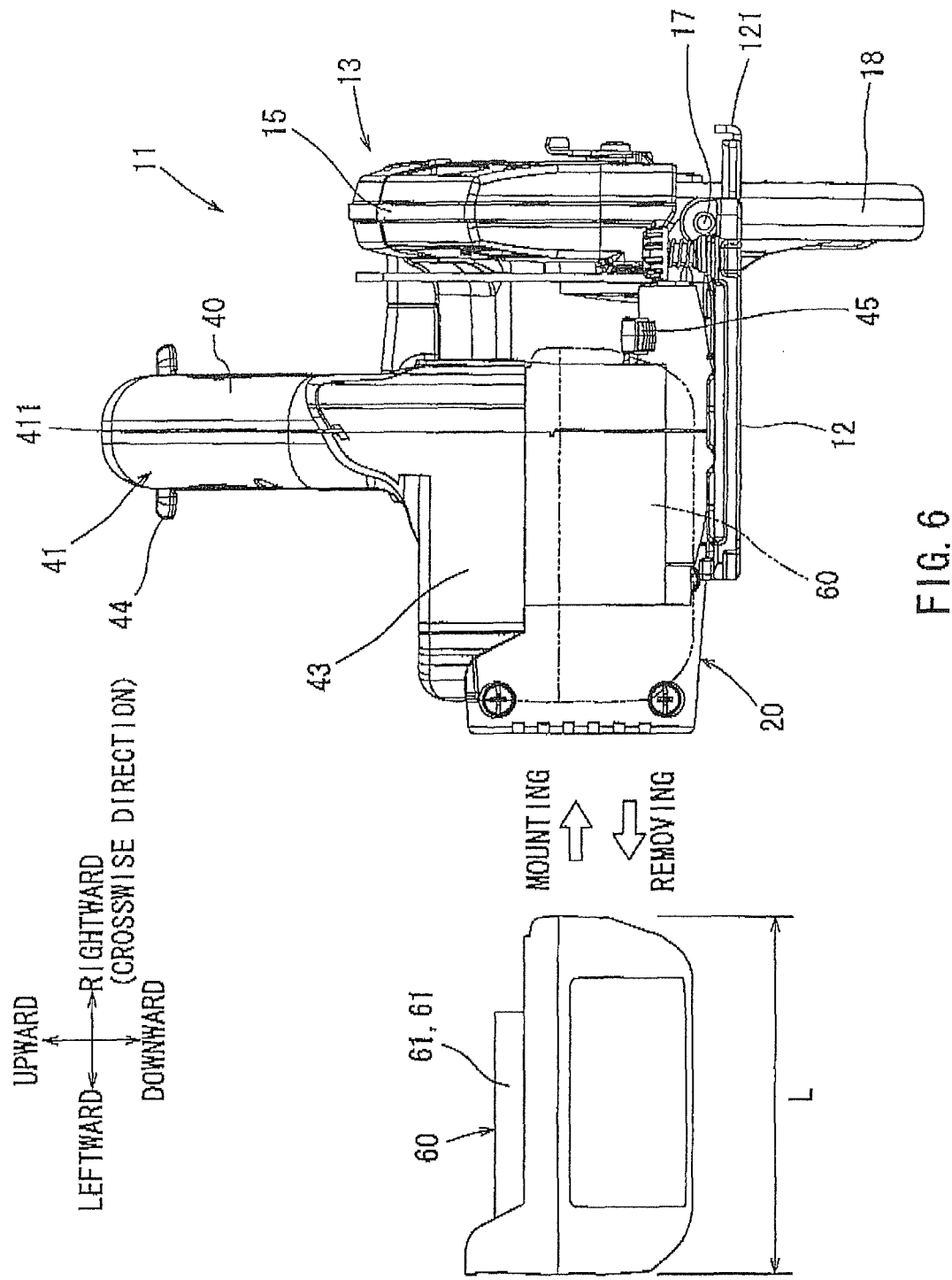
FIG. 6 is a rear view of the cutting tool, with the battery pack removed therefrom.

In the case of the present embodiment, the battery pack 60 may be mounted to the battery mounting portion 43 as the battery pack 60 is slid to the right relative to the battery mounting portion 43 as shown in FIG. 5. The battery pack 60 may be removed from the battery mounting portion 43 as it is slid to the left relative to the battery mounting portion 43 as shown in FIG. 6.

Figure 2:
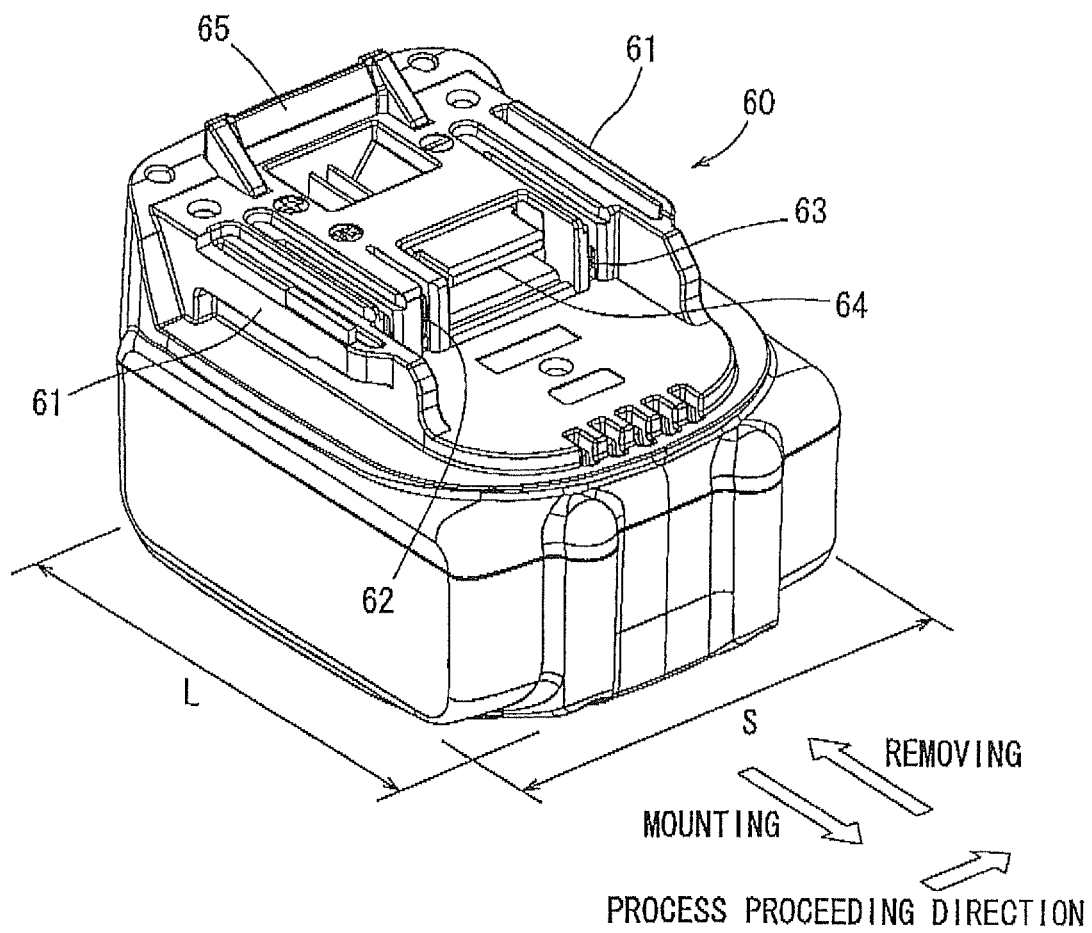
FIG. 2 is a perspective view of a battery pack.
Figure 3:
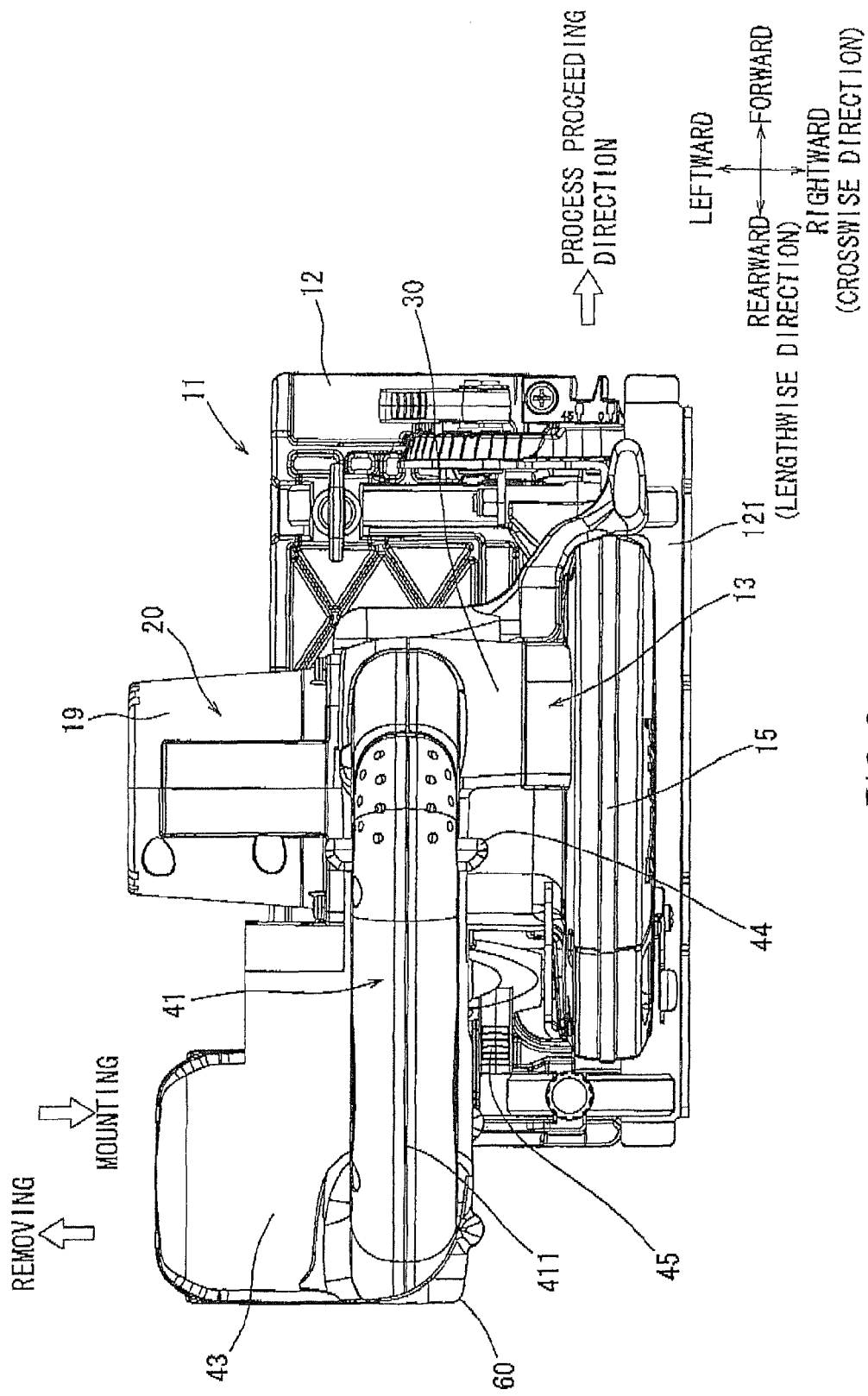
FIG. 3 is a plan view of the cutting tool.

The battery pack 60 may be a lithium ion battery having an output voltage of 14.4 V and may include a plurality of cells stored in a battery case. The battery pack 60 may be repeatedly used as the power source by being recharged by a separately prepared charger. As shown in FIG. 2, the battery pack 60 may have a substantially rectangular parallelepiped shape with a longer side dimension L and a shorter side dimension S in plan view. The direction along which the longer side extends will be called a "longer side direction", and the direction along which the shorter side extends will be called a "shorter side direction." In the following description, the longer side direction and the shorter side direction will also be referred to as a "longer side direction L" and a "shorter side direction S", respectively, of the battery pack 60 for distinction in orientation.

A pair of slide rails 61 may be provided on the upper surface of the battery pack 60. The slide rails 61 may extend in the longer side direction L so as to be parallel to each other. The battery pack 60 may be slid relative to the battery mounting portion 43 via the slide rails 61 for mounting and removing the battery pack 60.

Thus, the longer side direction L of the battery pack 60 is the direction in which the battery pack 60 is mounted to and removed from the battery mounting portion 43 (slide direction). This mounting and removing direction is the left and right direction (lateral direction) that is perpendicular to the machining proceeding direction and the joint plane 411 of the two-piece structure of the handle portion 41 and is also perpendicular to the left and right direction as seen from the user who operates the cutting tool 11. Thus, in the state in which the battery pack 60 is mounted to the battery mounting portion 43, the shorter side direction S of the battery pack 60 is parallel to the direction in which the handle portion 41 extends, and is also parallel to the forward and rearward direction of the cutting tool 11.

Between the two slide rails 61, there may be provided a positive terminal 62, a negative terminal 63, and a connection portion 64. The positive and negative terminals 62 and 63 may be connected to corresponding terminals provided on the battery mounting portion 43. The connection portion 64 may be connected to a control signal connector provided on the battery mount portion 43. When the battery pack 60 is mounted to the battery mounting portion 43 by being slid in the lateral direction (right direction), the battery pack 60 may be electrically connected to the battery mounting portion 43 via the terminals 62 and 63 and the connection portion 64.

Figure 4:
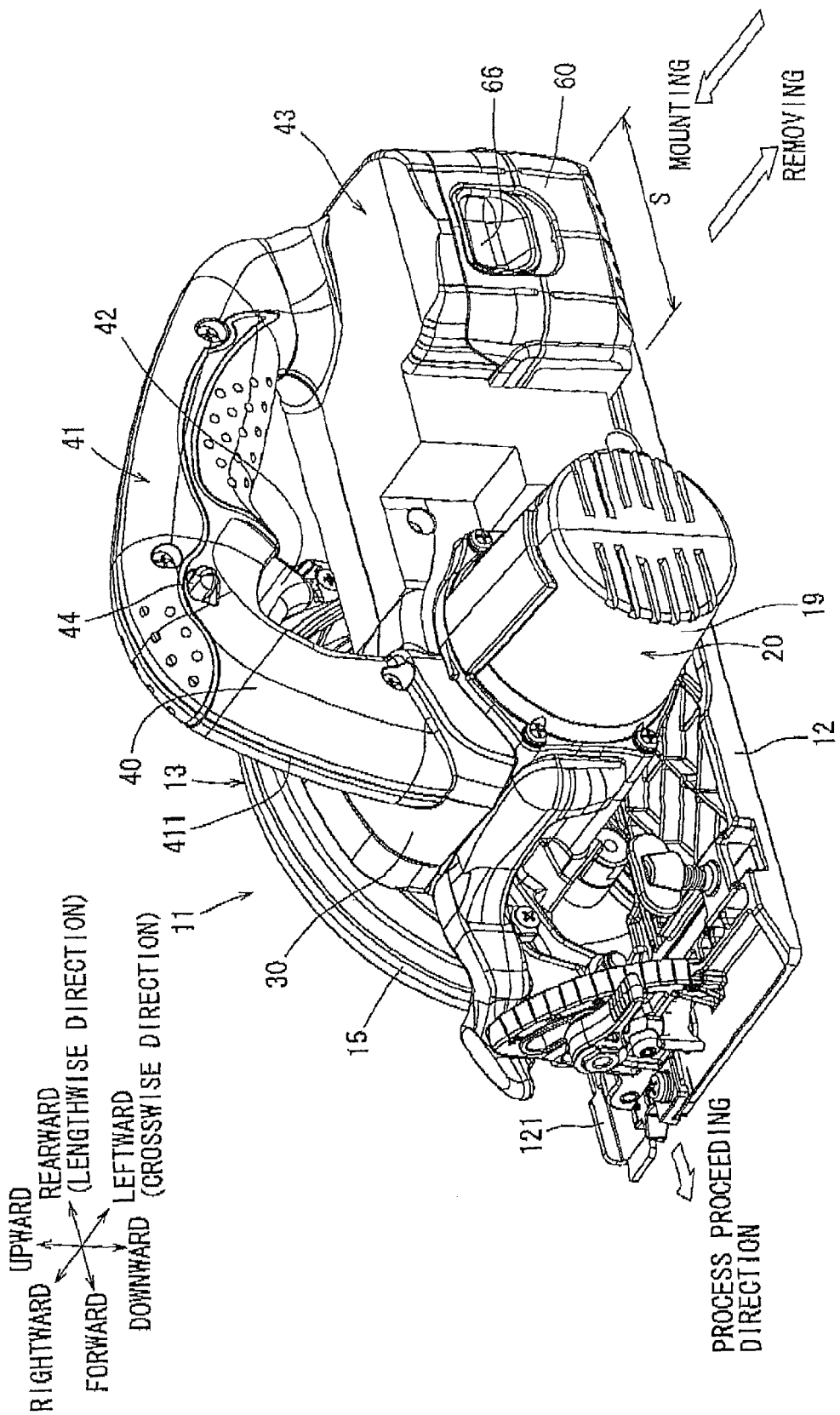
FIG. 4 is a perspective view, as seen obliquely from the left front side, of the cutting tool.

A lock claw 65 for locking the mounting state of the battery pack 60 with respect to the battery mounting portion 43 may be disposed at the end portion of the upper surface of the battery pack 60. Further, as shown in FIG. 4, on the removing-side end surface of the battery pack 60, there may be provided a removing button 66 that can be operated for downwardly moving the lock claw 65 for releasing the lock state.

With the cutting tool 11 of the reference embodiment constructed as described above, the battery pack 60 can be mounted and removed as the battery pack 60 is slid in the lateral direction (left and right direction perpendicular to the machining proceeding direction), while the battery pack 60 being oriented laterally relative to the battery mounting portion 43 provided at the rear portion of the handle portion 41 (i.e. with the longer side direction L of the battery pack 60 being oriented perpendicular to the machining proceeding direction). Therefore, in the mounted state, the shorter side direction S of the battery pack 60 is parallel to the forward and rearward direction of the cutting tool 11.

For this reason, as compared with the construction in which the battery pack is mounted longitudinally in the state that longer side direction of the battery pack is oriented in the forward and rearward direction relative to the battery mounting portion 43 and eventually relative to the rear portion of the handle portion 41, it is possible to achieve a reduction in size in the forward and rearward direction, whereby it is possible to achieve an improvement in terms of ease of handling when the user grasps the handle.

Further, due to the construction in which the battery pack 60 having a substantially rectangular parallelepiped shape is mounted laterally, with the longer side direction L thereof extending in the left and right direction, it is possible to set the center-of-gravity position thereof at a position on the front side (the side of the switch lever 42 of the handle portion 41) as compared with the construction in which the battery pack is mounted longitudinally, whereby it is possible to improve the weight balance when the user grasps the handle portion 41, which also helps to enhance the ease of handling of the cutting tool 11.

The above reference embodiment may be modified in various ways. For example, in the reference embodiment, the slide rails 61 are provided to extend along the longer side direction L of the battery pack 60, and the battery pack 60 is mounted as the battery pack 60 is slid laterally via the slide rails 61. However, the slide rails 61 may be provided to extend along the shorter side direction S, so that the battery pack 60 is laterally mounted as it is slid in the forward and rearward direction via the slide rails 61 extending in the shorter side direction S. Also in this construction, the battery pack 60 can be mounted laterally, with the shorter side direction S thereof extending along the machining proceeding direction, so that it is possible to reduce the size in the forward and rearward direction of the rear portion of the handle portion.

Further, in the reference embodiment, when the battery pack 60 is laterally oriented, the longer side direction L of the battery pack 60 is perpendicular to the machining proceeding direction, and the battery pack 60 is slid in the lateral direction that is perpendicular to the machining proceeding direction. However, the lateral orientation and the lateral sliding direction may not be restricted to be precisely perpendicular to the machining proceeding direction. Thus, the lateral orientation and/or the lateral sliding direction may be inclined with respect to the machining proceeding direction by an angle within an appropriate range.

First Embodiment

Next, a cutting tool 11A according to a first embodiment will be described with reference to FIGS. 7 through 14. The cutting tool 11A according to the first embodiment is also configured as a portable circular saw substantially similar to the hand-held cutting tool (cutting machine) according to the reference embodiment. The cutting tool 11A according to the first embodiment differs from the cutting tool 11 according to the reference embodiment described above in the construction of a handle portion 41A. Thus, in the following description of the cutting tool 11A according to the first embodiment, portions similar to those of the cutting tool 11 of the reference embodiment described above are labeled the same reference numerals as used for the description of the cutting tool 11 of the reference embodiment, and a description thereof will be left out.

In addition, in the description of the cutting tool 11A according to the first embodiment, portions differing in construction from the corresponding portions of the cutting tool 11 according to the reference embodiment are labeled with the same reference numerals as used for the description of the cutting tool 11 of the reference embodiment, with the sign "A" affixed to the end of the numerals. Also in the description of the cutting tool 11A according to the first embodiment, the side toward which the machining operation by the cutting tool 11A proceeds is referred to as the front side as shown in FIGS. 7 through 14.

The cutting tool 11A of the first embodiment also may have a tool main body 13A including the handle portion 41A to which the battery pack 60 can be mounted as the power source and which can be grasped by the user. As in the reference embodiment described above, the cutting tool 11A according to the first embodiment also has the base 12 which can be placed on the workpiece to be cut, and the tool main body 13A is supported on the base 12. The tool main body 13A may have a drive section 20 arranged on the upper side of the base 12. The handle portion 41A may be provided on the upper side of the drive section 20. The handle portion 41A may have a housing 40A having a hollow structure. The housing 40A may be made of synthetic resin. On the lower side of the handle portion 41A, there is provided a hand-grasping space (indicated by numeral 50) allowing grasping of the handle portion 41A by hand of the user.

Figure 7:
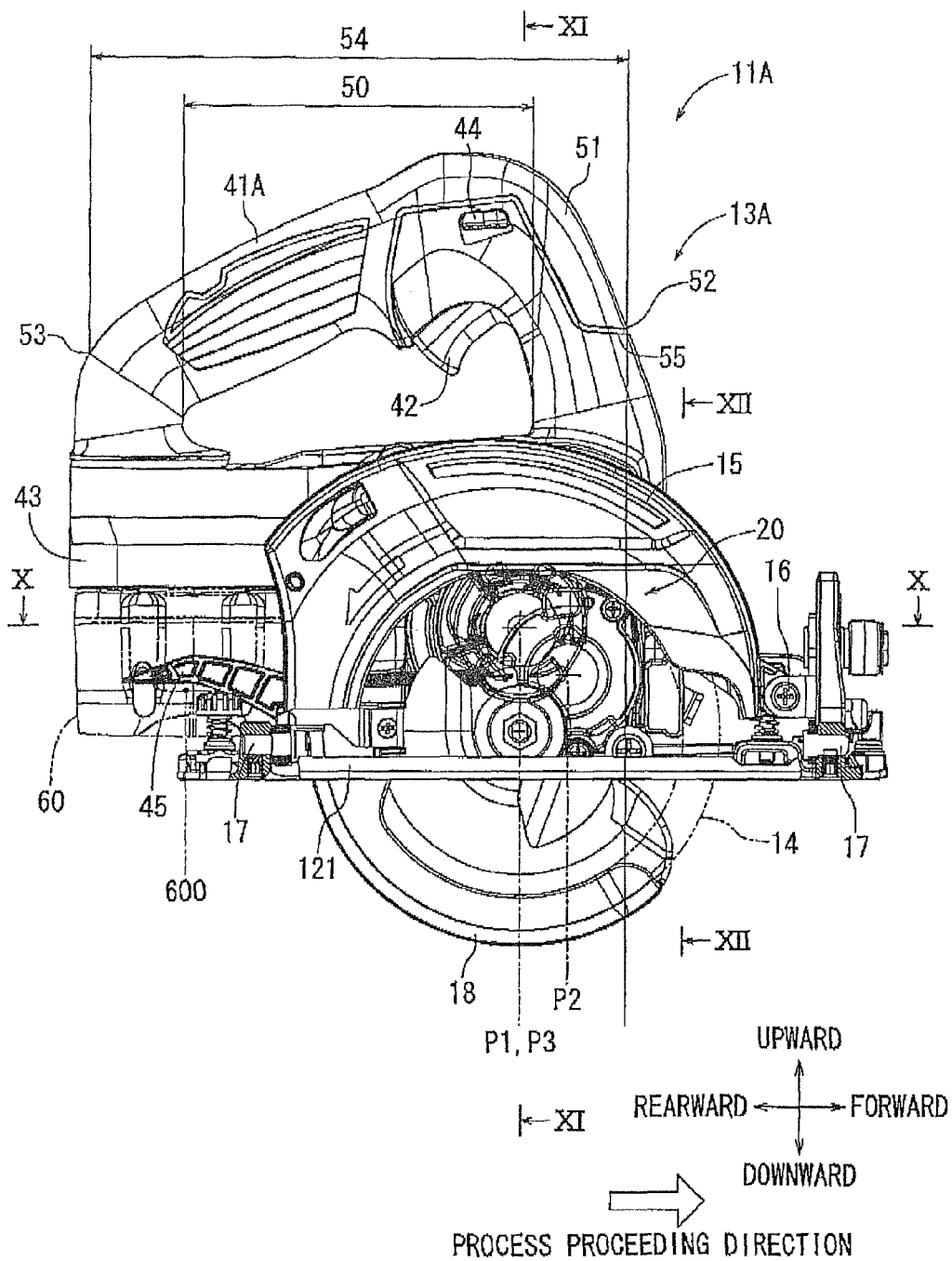
FIG. 7 is a side view, as seen from the right side, of a cutting tool according to a first embodiment.
Figure 8:
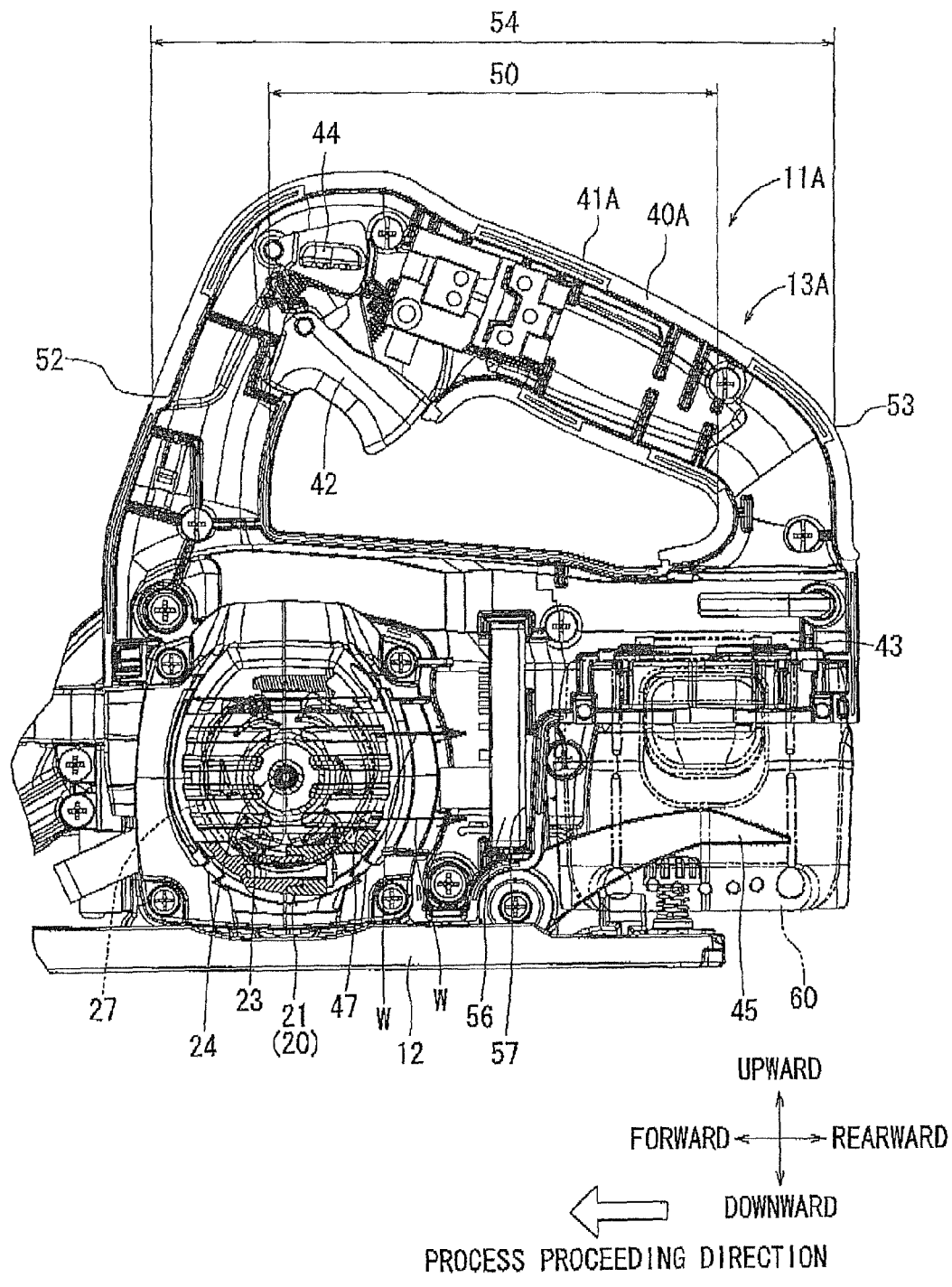
FIG. 8 is a side view of the cutting tool of FIG. 7 as seen from the left side.
Figure 9:
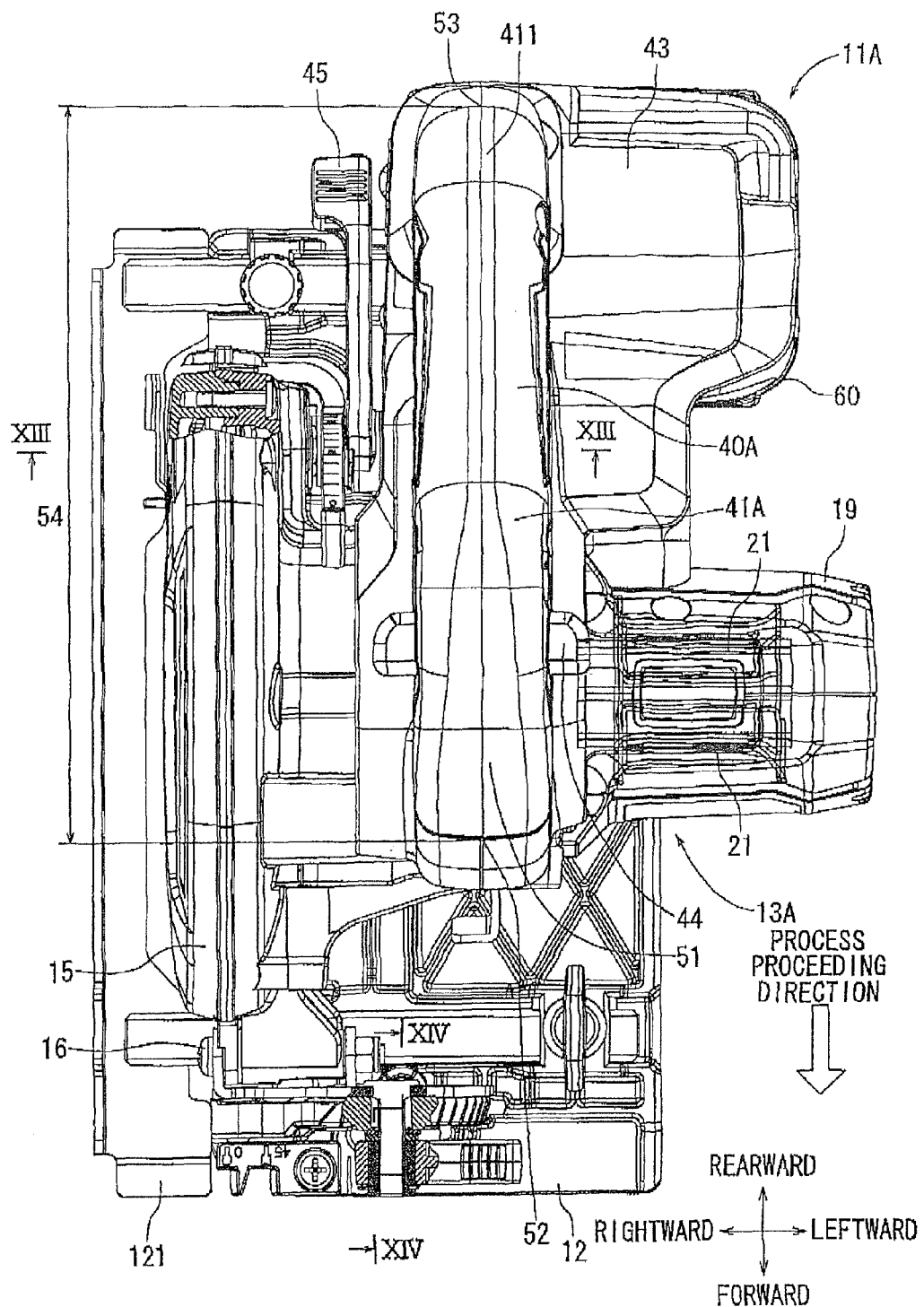
FIG. 9 is a plan view of the cutting tool of FIG. 7.

As shown in FIG. 7, etc., a portion of the handle portion 41A to be touched by the user may be covered with a non-slip covering portion 51. In order to allow it to exert the slip preventing function, the non-slip covering portion 51 may be made, for example, of thermoplastic elastomer (TPE). That is, the non-slip covering portion 51 may be provided on the portion of the handle portion 41A of the cutting tool 11A where the slip preventing function is desired. The non-slip covering portion 51 made of elastomer may be integrally formed with the handle portion 41A. As shown in FIG. 7, etc, the range (indicated by numeral 54) where the non-slip covering portion 51 is provided extends between a position on the front side and a position on the rear side of the hand-grasping space (indicated by numeral 50) of the handle portion 41A. That is, a front end 52 of the non-slip covering portion 51 is positioned on the front side of the front end of the hand-grasping space (indicated by numeral 50) formed on the lower side of the handle portion 41A. Further, a rear end 53 of the non-slip covering portion 51 is positioned on the rear side of the rear end of the hand-grasping space (indicated by numeral 50). In this way, the range (indicated by numeral 54) from the front end 52 to the rear end 53 of the non-slip covering portion 51 is longer than range of the hand-grasp space (indicated by numeral 50) of the handle portion 41A. A part of the non-slip covering portion 51 on the side of the front end 52 is delimited by a cutout groove 55 that defines the outer periphery of the non-slip covering portion 51. The non-slip covering portion 51 may be made of any kind of synthetic resin as long as it can provide a slip preventing function.

The drive section 20 may include the electric motor 21 and the speed reduction gear section 30. The electric motor 21 may be a brushless motor and may generate a rotational drive force with the supply of electric power from the battery pack 60. The electric motor 21 includes a stator 22 capable of being magnetized and a rotor 23 including permanent magnets. The stator 22 generates magnetic flux with the supply of the electric power in order to rotate the rotor 23. The rotor 23 may be integrated with a motor shaft 24 serving as a rotational shaft of the rotor 23. The motor shaft 24 may be rotatably supported by bearings 25 and 26 that are respectively mounted within a motor housing 19 and a gear housing 30A of the reduction gear section 30 (see FIGS. 10 and 11). Both the bearings 25 and 26 may be ball bearings. A cooling fan 27 and a pinion gear 28 may be mounted to the motor shaft 24 so as to rotate together with the motor shaft 24. The pinion gear 28 may be also called a motor gear. The cooling fan 27 may be a centrifugal fan. The cooling fan 27 rotates together with the motor shaft 24 as indicated by symbol W (cooling air) in FIG. 10, whereby external air may be drawn into the tool main body 13A via intake openings 47 (see FIG. 8) and may flow toward the stator 22, which may generate heat, so as to cool it. After cooling the stator 22, the cooling air W may flow toward the blade case 15 as exhaust air. The pinion gear 28 is disposed at the right end of the motor shaft 24 and may be formed with the outer peripheral surface of the motor shaft 24. The pinion gear 28 meshes with an intermediate drive gear 31 described later for transmitting the rotational drive force generated by the electric motor 21 to the speed reduction gear section 30.

The speed reduction gear section 30 may include a row of spur gears that are disposed within the gear housing 30A and mesh with each other for reducing the speed of the rotation of the motor shaft 24. The row of spur gears of the speed reduction gear section 30 may include the intermediate drive gear 31 in mesh with the pinion gear 28, and an output gear 35 in mesh with the intermediate drive gear 31. The intermediate drive gear 31 rotates together with an intermediate shaft 32 serving as a rotational shaft that is rotatably supported. The intermediate shaft 32 may be called a second rotational shaft. The intermediate shaft 32 is rotatably supported by bearings 33 and 34 mounted within the gear housing 30A. The bearings 33 and 34 may be ball bearings. The output gear 35 rotates together with an output shaft 36 serving as a rotational shaft that is rotatably supported. The output shaft 36 may be called a third rotational shaft. The output shaft 36 may be rotatably supported by bearings 37 and 38 mounted to the gear housing 30A. The right end of the output shaft 36 may protrude into the interior of the blade case 15. At the right end of the output shaft 36, there is provided a holder 39 for holding the saw blade 14. The holder 39 may have an appropriate clamping structure for holding the saw blade 14. In this way, as the rotational drive force is generated by the electric motor 21, the output shaft 36 may receive the drive force reduced in two stages by the intermediate drive gear 31 and the output gear 35.

The bearing 37 and the bearing 38 for rotatably supporting the output shaft 36 may be disposed on the axially outer side and the axially inner side with respect to the electric motor 21, respectively, and therefore, the bearing 37 and the bearing 38 will be hereinafter also called an inner side supporting bearing 37 and an outer side supporting baring 38, respectively. The outer side supporting bearing 38 supports a portion of the output shafts 36 proximal to a portion where the saw blade 14 is mounted. The inner side supporting bearing 37 may be a needle bearing (needle-like runner). The outer side supporting bearing 38 may include two ball bearings 381 and 382. The two ball bearings 381 and 382 are arranged side by side so as to be adjacent to each other. In this way, the output shaft 36 is rotatably supported by three bearings, i.e., the inner side supporting bearing 37 that is a needle bearing, and the two ball bearings 381 and 382 forming the outer side supporting bearing 38. These three bearings 37, 381, and 382 are mounted within the gear housing 30A. The side where the saw blade 14 is mounted to the output shaft 36 and where the outer side supporting bearing 38 is arranged may be called one end side with respect to the output shaft 36. The opposite side where the inner side supporting bearing 37 may be called the other end side with respect to the output shaft 36. In this way, the output shaft 36 is rotatably supported by the inner side supporting bearing 37 and the outer side supporting bearing 38 (381, 382). Here, between the inner side supporting bearing 37 and the outer side supporting bearing 38, there is a difference in the axial bearing length contacting with the output shaft 36. That is, the axial length (indicated by numeral 380) along which the outer side supporting bearing 38 (381, 382) contacts the output shaft 36 is larger than the axial length (indicated by numeral 370) along which the inner side supporting beating 37 contacts the output shaft 36. More specifically, the sum of the axial lengths (indicated by numeral 380) of the ball bearings 381 and 382 for contacting with the output shaft 36 is slightly larger than the axial length (indicated by numeral 370) of the inner side supporting bearing 37 for contacting with the output shaft 36. Because the inner side supporting bearing 37 is a needle bearing, the axial length (indicated by numeral 370) of the inner side supporting bearing 37 may be set to be slightly smaller than or substantially the same as the axial length (indicated by numeral 380) of the outer side supporting bearing 38 including the two ball bearings 381 and 382 arranged side by side.

The motor shaft 24, the intermediate shaft 32, and the output shaft 36 arranged in the gear housing 30A of the tool main body 13A may have the following positional relationship in the forward and rearward direction, in which the machining operation proceeds: That is, as shown in FIG. 7, a position (P1) of the motor shaft 24 in the forward and rearward direction is within the range of the hand-grasping space (indicated by numeral 50) of the handle portion 41A. Further, as shown in FIG. 7, a position (P3) of the output shaft 36 in the forward and rearward direction is also within the range of the hand-grasping space (indicated by numeral 50) of the handle portion 41A. Although the motor shaft 24 and the output shaft 36 are positioned at different positions (P1 and P3) in the vertical direction, their positions (P1 and P3) in the forward and rearward direction may coincide with each other. Therefore, the positions (P1 and P3) of the motor shaft 24 and the output shaft 36 in the forward and reward direction may be set such that the handle portion 41A is within the length of the tool main body 13A in the forward and rearward direction. Furthermore, the positions (P1 and P3) of the motor shaft 24 and the output shaft 36 in the forward and rearward direction may be set so as to be situated on the front side of the center-of-gravity position 600 of the battery pack 60 mounted to the battery mounting portion 43 as described in connection with the reference embodiment.

In contrast, a position (P2) of the intermediate shaft 32 in the forward and rearward direction may be situated on the front side of the positions (P1 and P3) of the motor shaft 24 and the output shaft 36. Further, as shown in FIG. 7, the position (P2) in the forward and rearward direction of the intermediate shaft 32 may be set so as to be situated on the front side of the hand-grasping space (indicated by numeral 50) of the handle portion 41A. Further, the position (P2) of the intermediate shaft 32 in the forward and rearward direction may be set so as to be situated on the rear side of the front end 52 of the non-slip covering portion 51 provided on the handle portion 41A. Furthermore, the position (P2) of the intermediate shaft 32 in the forward and rearward direction may be set at substantially the intermediate position between the positions (P1 and P3) of the motor shaft 24 and the output shaft 36 and the position of the front end 52 of the non-slip covering portion 51 provided on the handle portion 41A. The position of the intermediate shaft 32 in the vertical direction may be situated substantially at an intermediate position between the motor shaft 24 and the output shaft 36 in the vertical direction.

A controller 56 for performing various controls related to the rotation of the electric motor 21 may be disposed within the tool main body 13A. More specifically, the controller 56 may be retained within a controller retaining compartment 70. The controller retaining compartment 70 includes a left portion attached to a rear side surface of the left end portion of the gear housing 30A, and a right portion attached to a rear side surface of the motor housing 19. The motor housing 19 and the gear housing 30A are parts of the tool main body 13A, and therefore, the controller retaining compartment 70 also is a part of the tool main body 13A. The controller 56 may have a package having various electrical components contained therein and supported by a base member 57. The package may have a flat box shape, such as a flat rectangular box shape, having two opposite longer side surfaces (i.e., the most widely extending surfaces) and four or more shorter side surfaces connecting between the opposite longer side surfaces. The controller 56 inclusive of the base member 57 is supported within the controller retaining compartment 70. More specifically, the base member 57 of the controller 56 is mounted within the controller retaining compartment 70. The electrical components of the controller 56 may function to adjust the electric power supplied to the electric motor 21. The electrical components may include those serving as a regular control circuit for adjusting the electric power supplied to the electric motor 21 in a normal use, and may also include those serving as an auto stop (AS) control circuit for automatically turning off the power source under a predetermined condition. More specifically, the AS control circuit may perform control so as to forcibly turn off the electric power supplied to the electric motor 21 in the case where the battery pack 60 mounted to the battery mounting portion 43 has been over-discharged or where the electric motor 21 has been brought to an over-current state.

Figure 10:
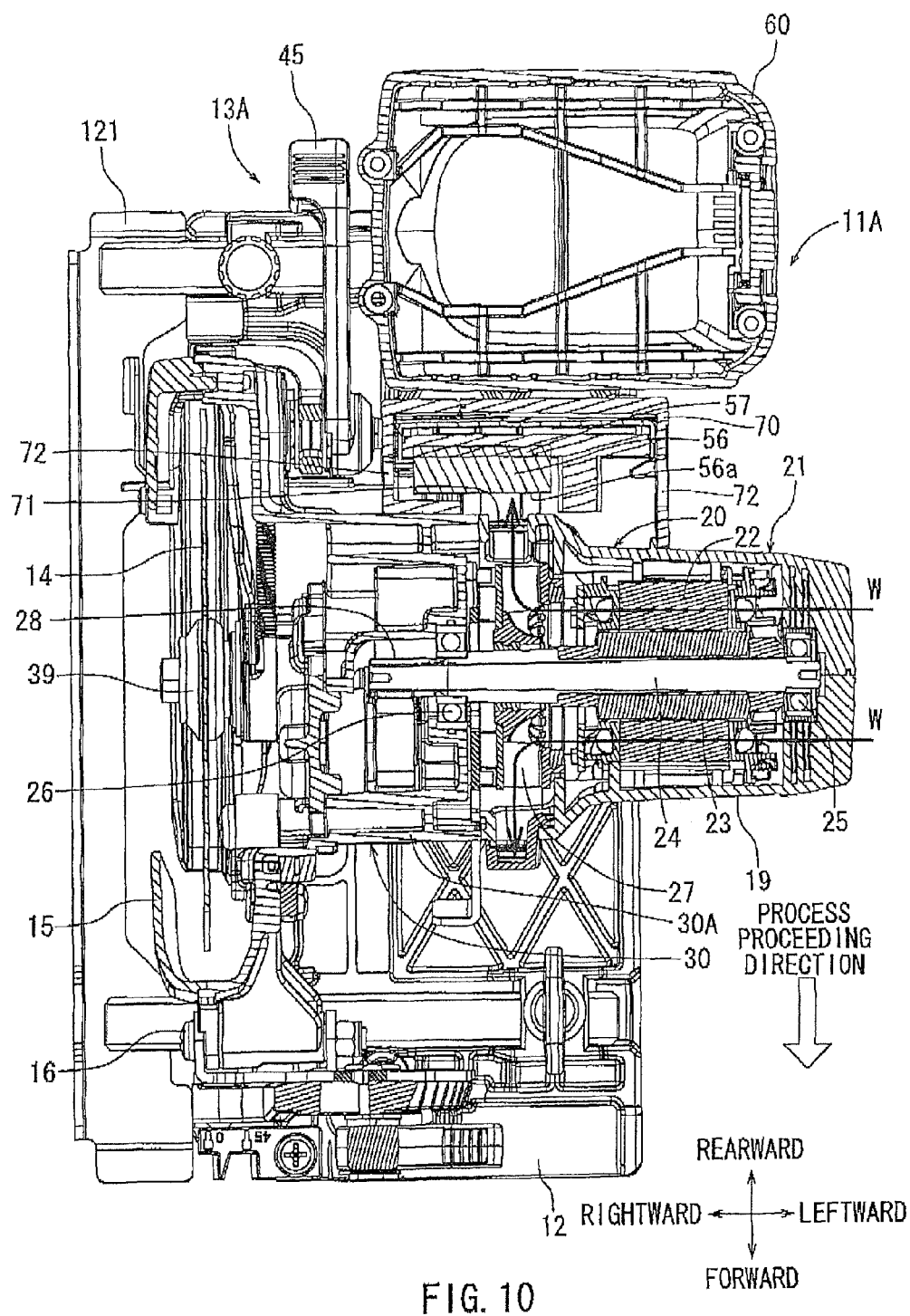
FIG. 10 is a sectional view taken along arrow line X-X of FIG. 7, illustrating the internal structure of the cutting tool of FIG. 9.
Figure 11:
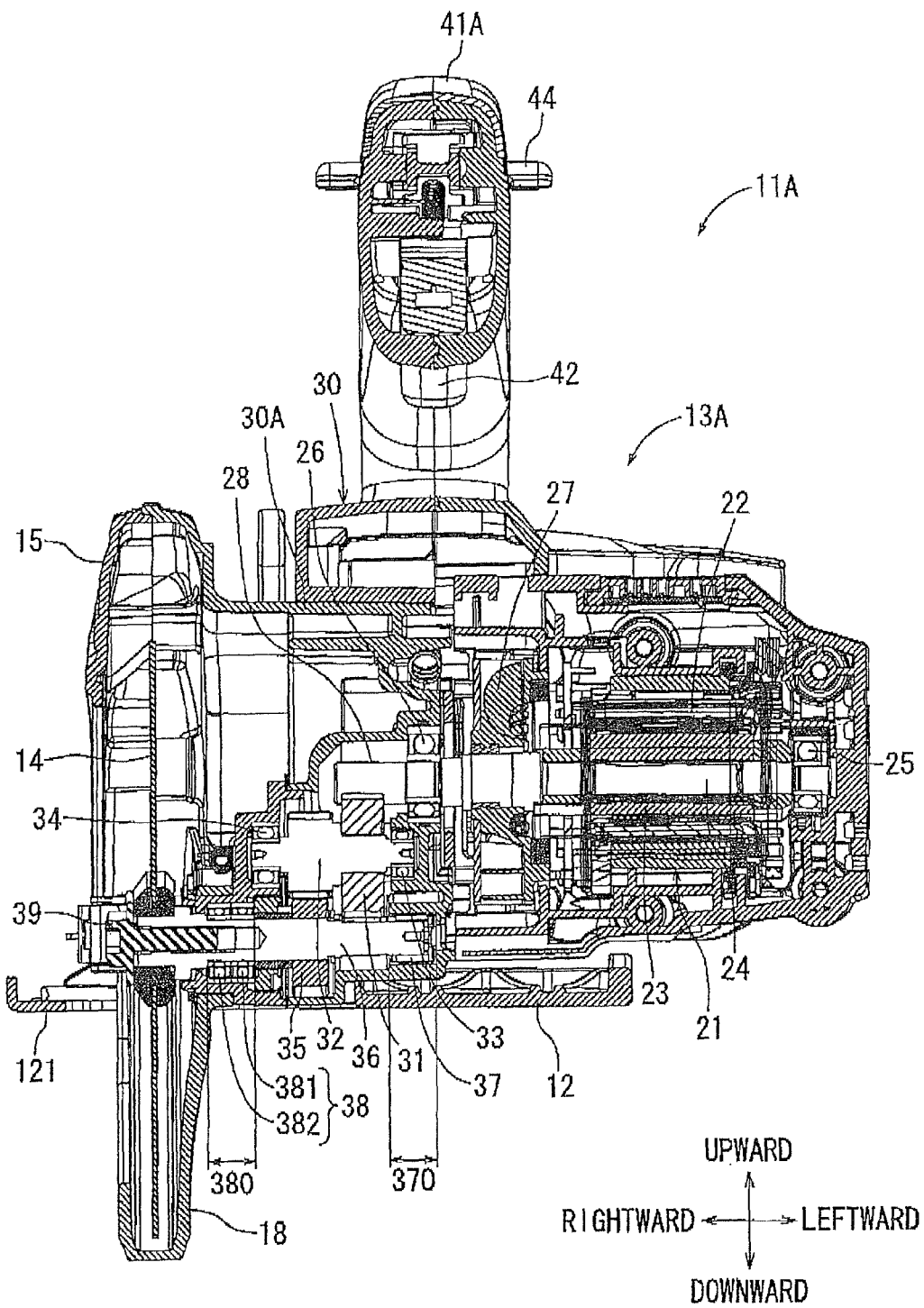
FIG. 11 is a sectional view, taken along line XI-XI of FIG. 7, of the cutting tool.
Figure 12:
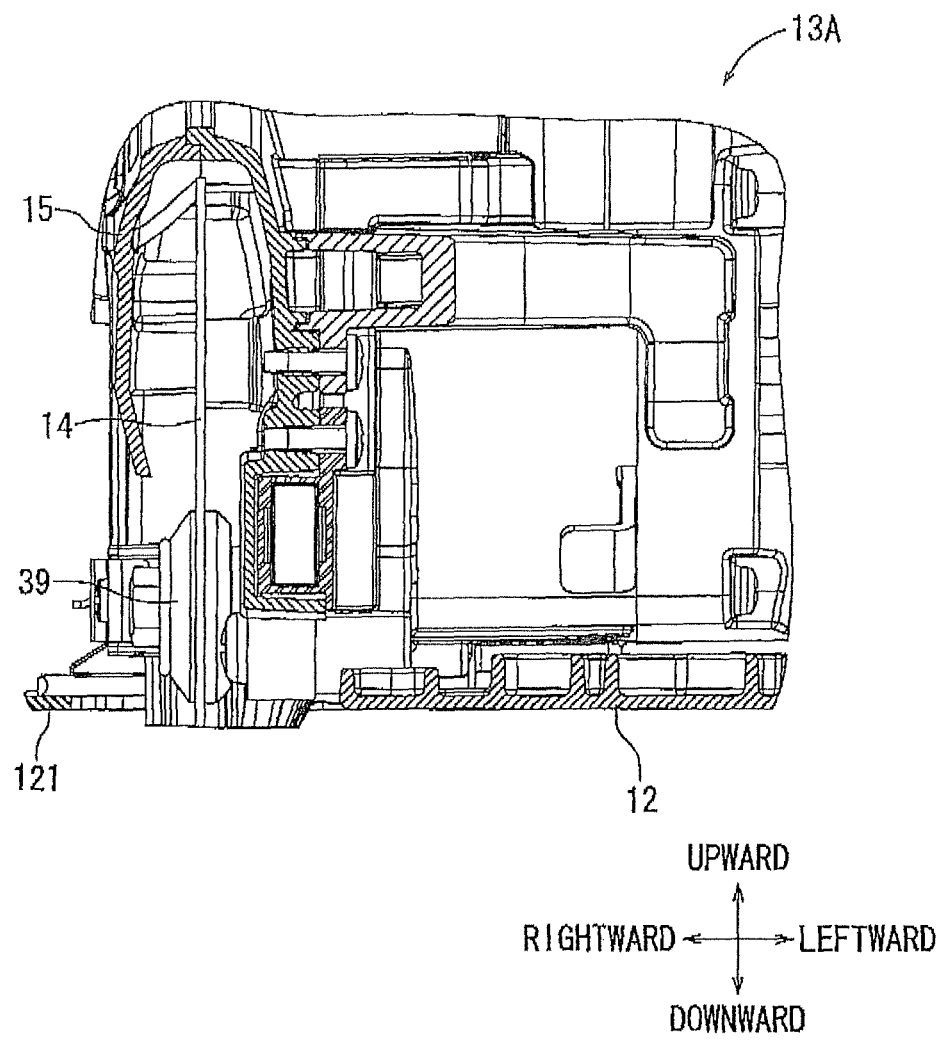
FIG. 12 is a sectional view, taken along line of FIG. 7, of the cutting tool.
Figure 13:
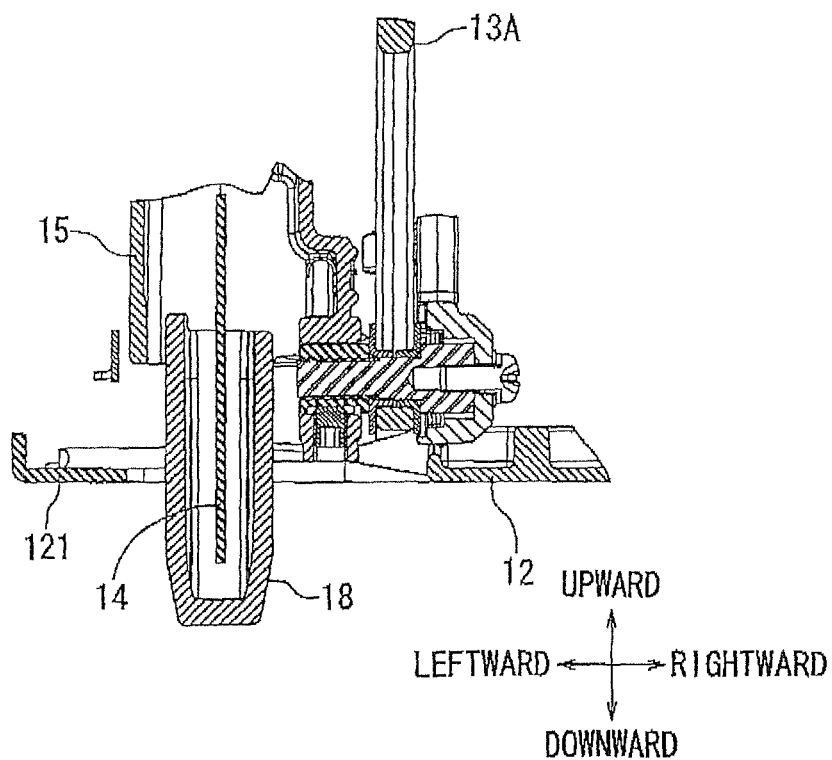
FIG. 13 is a sectional view, taken along line XIII-XIII of FIG. 9, of the cutting tool.
Figure 14:
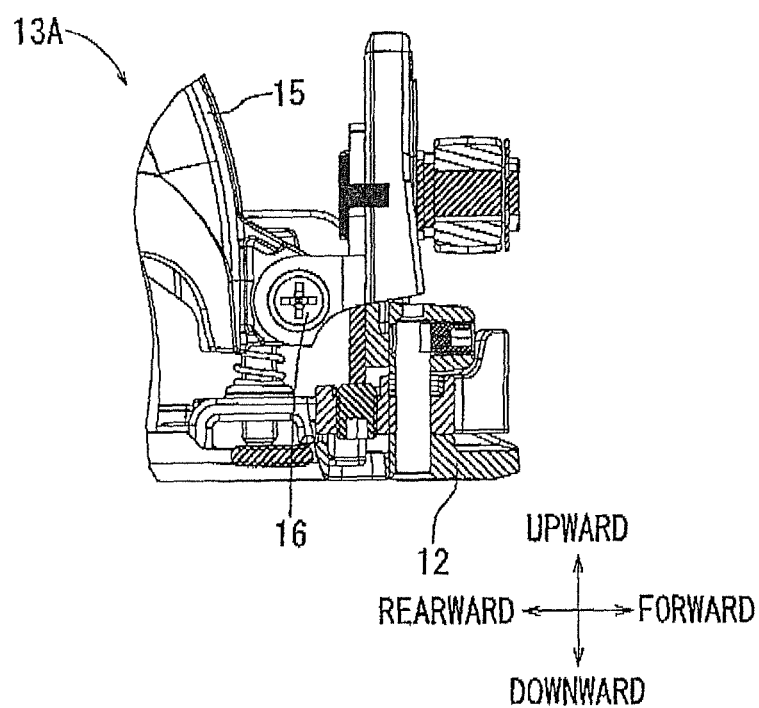
FIG. 14 is a sectional view, taken along line XIV-XIV of FIG. 9, of the cutting tool.

As shown in FIG. 10, the controller 56 is mounted within the controller retaining compartment 70 such that a front surface 56a of the controller 56 is situated on a radially outer side of the cooling fan 27. The interior of the controller retaining compartment 70 communicates within the motor housing 19 via an internal communication hole 71 formed in the rear side surface of the motor housing 19. The interior of the controller retaining compartment 70 may be opened to the outside via external communication holes 72 formed in the left and right side walls of the controller retaining compartment 70. Therefor; a portion of the flow of cooling air W produced by the cooling fan 27 may flow into the controller retaining compartment 70 via the internal communication hole 71. After cooling the controller 56, the air may be discharged to the outside of the controller retaining compartment 70 via the external communication holes 72. In this way, the controller 56 is arranged in the passage of the exhaust air flowing from the cooling fan 27 that cools the electric motor 21. Further, the controller 56 is positioned within the controller retaining compartment 70 (i.e, within the tool main body 13A) such that a thickness direction that is a direction of a shorter side (along the forward and rearward direction as viewed in FIG. 10) of the controller 56 extends in the machining proceeding direction (the forward and rearward direction). Further, this controller 56 is positioned on the rear side of the electric motor 21 in the machining proceeding direction, and is positioned on the front side of the battery mounting portion 43 in the machining proceeding direction.

With the cutting tool 11A according to the first embodiment, the positions of the motor shaft 24 and the output shaft 36 are set so as to be within the length of the handle portion 41A in the machining proceeding direction, so that it is possible to reduce the size of the cutting tool 11A in the machining proceeding direction and to achieve an improvement in terms of handling. Further, in the above-described cutting tool 11A, the positions of the motor shaft 24 and the output shaft 36 are situated on the front side in the machining proceeding direction of the center-of-gravity position 600 of the battery pack 60, while being within the length of the handle portion 41A in the machining proceeding direction, so that it is possible to improve the cutting tool 11A in terms of weight balance in forward and rearward direction along the machining proceeding direction. As a result, it is possible to achieve an enhancement in terms of ease of handling of the cutting tool 11A. Further, in the above-described cutting tool 11A, the position of the intermediate shaft 32 is situated on the front side of the positions of the motor shaft 24 and the output shaft 36 in the machining proceeding direction, and is situated on the rear side in the machining proceeding direction of the front end 52 of the non-slip covering portion 51 provided on the handle portion 41A, so that it is possible to further improve the cutting tool 11A in terms of balance in the forward and rearward direction along the machining proceeding direction.

Further, in the above-described cutting tool 11A, the controller retaining component 70 that is a part of the tool main body 13A is arranged such that the front surface 56a of the controller 56 is positioned on a radially outer side of the cooling fan 27. More specifically, the controller 56 is positioned on the outer peripheral side in the centrifugal direction with respect to the cooling fan 27 that is a centrifugal fan. As a result, it is possible to apply the exhaust air blown out by the cooling fan 27 to the front surface 56a of the controller 56, making it possible to achieve the effect of cooling the controller 56 with this exhaust air. Thus, it is possible to achieve a reduction in the size of the hand-held cutting tool 11A while securing the cooling the controller 56 by utilizing the cooling fan 27. Further, in the above-described cutting tool 11A, the controller 56 is arranged on the rear side of the electric motor 21 with respect to the machining proceeding direction, so that it is possible to achieve a reduction in size in the machining proceeding direction of the cutting tool 11A. As a result, it is possible for the cutting tool 11A to be one that allows easy machining operation. Further, in the above-described cutting tool 11A, the controller 56 is positioned such that its shorter side direction (i.e., the thickness direction) extends along the machining proceeding direction, so that it is possible to reduce the size in the machining proceeding direction of the space necessary for the controller 56. As a result, it is possible to reduce the size in the machining proceeding direction of the cutting tool 11A, making it possible for the cutting tool 11A to be one allowing easy machining operation.

Further, in the above-described cutting tool 11A, the output shaft 36 is supported by the three bearings 37, 381, and 382, so that, the output shaft 36 can be more stably supported as compared with the case where the output shaft is supported by two bearings. As a result, it is possible to achieve an improvement in terms of rotation support precision by bearings while achieving a reduction in the size of the cutting tool 11A. Further, in the above-described cutting tool 11A, the two ball bearings 381 and 382 are arranged side by side on the side of a portion of the output shaft 36 where the saw blade 14 is attached, so that it is possible to achieve an improvement in terms of rotation support, while the support being intensively made for the portion of the output shaft 36 where the saw blade 14 is attached. Further, in the above-described cutting tool 11A, in receiving the rotational drive force of the electric motor 21, the output shaft 36 is reduced in speed in two stages, so that it is possible to achieve an improvement in terms of rotation support precision while achieving an improvement in terms of torque due to speed reduction. Further, in the above-described cutting tool 11A, the axial length of the portion of the output shaft 36 contacting with the outer side supporting bearing 38 (381, 382) is set to be larger than the axial length of the portion of the output shaft 36 contacting with the inner side supporting bearing 37, so that it is possible to achieve an improvement in terms of rotation support precision, while the rotation support precision being intensively improved for the portion of the output shaft 36 where the saw blade 14 is attached.

Second Embodiment

Figure 15:
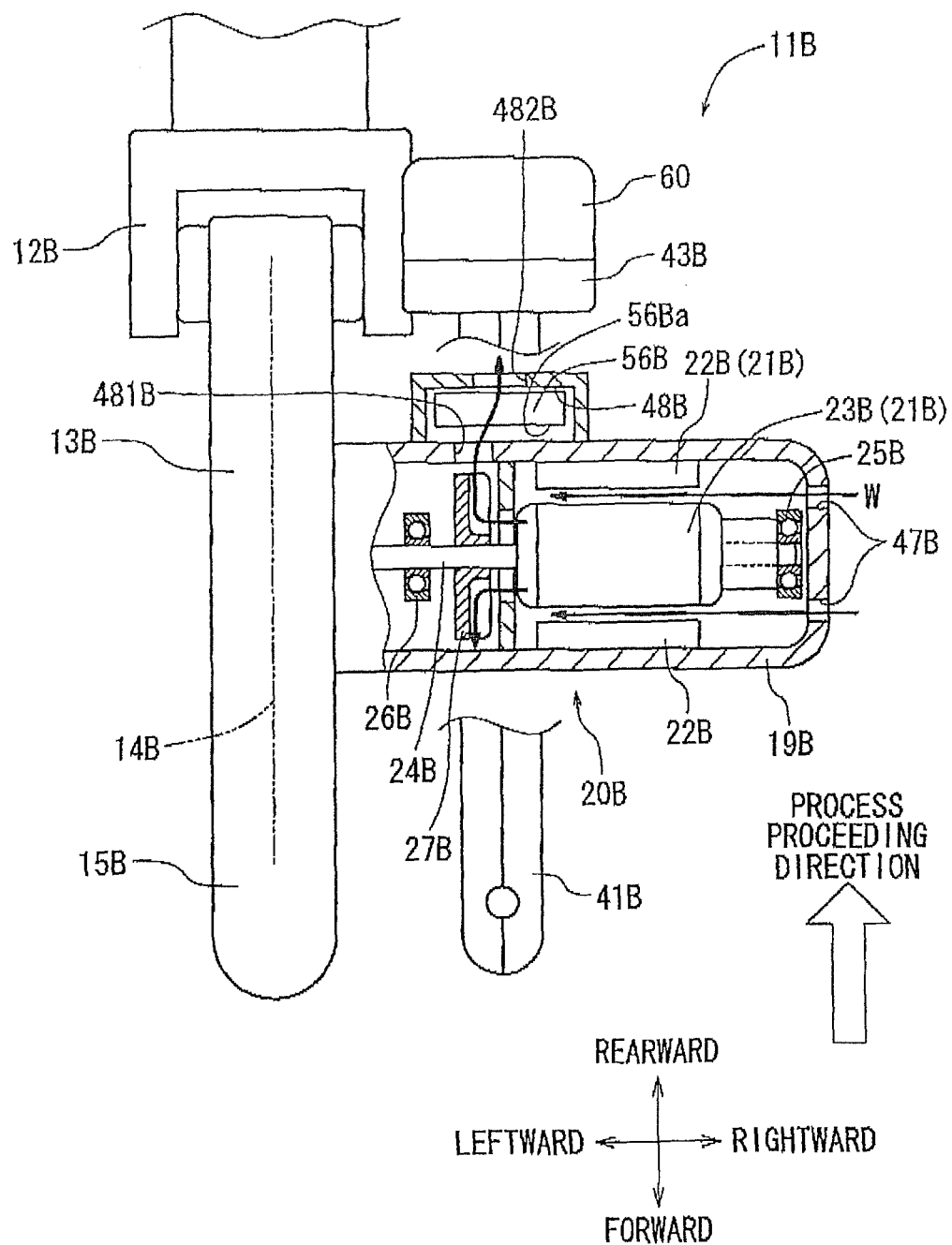
FIG. 15 is a schematic view, with a part broken away for showing the internal structure, of a cutting tool according to a second embodiment.

Next, a cutting tool 11B according to a second embodiment will be described with reference to FIG. 15. FIG. 15 schematically illustrates a part of a tool main body 13B of the cutting tool 11B according to the second embodiment. In particular, FIG. 15 schematically illustrates an arrangement of an electric motor 21B and a controller 56B and also schematically illustrates a structure allowing the cooling of the controller 56B. Also, similar to the controller 56 of the first embodiment, the controller 56B may have a package having various electrical components contained therein and supported by a base member (not shown).

In the description of the cutting tool 11B according to the second embodiment, the letter "A" at the end of the reference numerals used for the elements of the cutting tool according to the first embodiment is replaced by the letter "B" for some elements. As shown in FIG. 15, for the cutting tool 11B according to the second embodiment, the side opposite to the machining proceeding direction of the cutting tool 11B is referred to as the front side. The cutting tool 11B is a cutting tool (cutting machine) of a type generally referred to as a slide circular saw that is a variant of a table circular saw configured to perform a cutting operation through a vertical tilting movement of a tool main body. In the case of the slide circular saw, the cutting operation can be performed through a horizontal sliding movement of the tool main body in addition to the cutting operation through the vertical tilting movement of, the tool main body. That is, although the cutting tool 11A according to the first embodiment described above is a hand-held cutting tool, the cutting tool 11B according to the second embodiment is a cutting tool configured to perform a cutting operation without being held by hand of the user and may be placed on the ground or on a bench (placing stand) for the cutting operation. The cutting tool 11B may have a base (not shown) configured to be placed on the ground or on a bench, and a turntable (not shown) supported by the base. A tool main body 13B may be supported on the upper side of the table via a support mechanism 12B. The support mechanism 12B supports the tool main body 13B so as to allow a vertical tilting movement and a horizontal sliding movement of the tool main body 13B. Thus, the tool main body 13B may cut a workpiece as it is slid rearwardly in a state where the while it is lowered toward the table. In FIG. 15, numeral 41B indicates a handle portion to be grasped by the user. Further, in FIG. 15, numeral 43B indicates a battery mounting portion, to which the battery pack 60 is mounted.

The tool main body 13B may include a blade case 15B covering substantially the upper half of a circular saw blade 14B. On the right-hand side of the blade case 15B, there may be provided a drive section 20B of the tool main body 13B. This drive section 20B includes a motor housing 19B having an electric motor 21B and a rotation transmission mechanism (not shown) disposed therein. The electric motor 21B has a stator 22B and a rotor 23B, and is configured to rotate a motor shaft 24B. The rotation transmission mechanism may receive a rotational drive force from a pinion gear (not shown) mounted to the motor shaft 24B. The pinion gear may serve as a motor gear and may be configured to transmit a rotational drive force generated by the electric motor 21B to a speed reduction gear train of the rotation transmission mechanism (not shown). The motor shaft 24B may have a base end (the right end as seen in FIG. 15) supported by a base end side bearing 25B, and a leading end (the left end as seen in the drawing) supported by a leading end side bearing 26B. The bearings 25B and 26B may be fixedly mounted within the motor housing 19B. Further, intake openings 47B may be formed in an end portion on the base end side (the right side as seen in the drawing) of the motor housing 19B to establish communication between the interior and the exterior of the motor housing 19B.

A cooling fan 27B may be mounted to the motor shaft 24B at a position between the rotor 23B of the motor shaft 24B and the bearing 26B disposed on the left side, so that the cooling fan 27B rotates using the motor shaft 24B as the rotation shaft. This cooling fan 27B may be a centrifugal fan configured to rotate together with the motor shaft 24B, drawing air from the direction along the motor shaft 24B and discharging it in the radial direction (centrifugal direction) with respect to the motor shaft 24B. That is, as the cooling fan 27B rotates together with the motor shaft 24B, external air is dawn into the interior of the tool main body 13B from the intake openings 47B to cool the electric motor 21B that may generate heat. I addition, the air may cool the controller 56B that may be disposed within a controller retaining compartment 48B described below.

The motor housing 19B is provided with the controller compartment 48B, which is arranged on the rear side of the electric motor 21B so as to be adjacent thereto. The controller retaining compartment 48B retains the controller 56B therein. As in the case of the controller 56 of the first embodiment, the controller 56B may perform various controls related to the rotation of the electric motor 21B. That is, the controller 56B may include electrical components serving as a regular control circuit for adjusting the electric power supplied to the electric motor 21B in a normal states and also include electrical components serving as an auto stop (AS) control circuit for automatically turning off the power source under a predetermined condition.

The motor housing 19B may have an internal communication hole 481B communicating with the interior of the controller retaining compartment 48B. The controller retaining compartment 48B may include an external communication hole 482B. The internal communication hole 481B may be arranged in correspondence with the position where the air flows from the cooling fan 27B. The external communication hole 482B is provided on the side opposite to the internal communication hole 481B with respect to the controller 58B. Thus, the cooling air may flow from the cooling fan 27B as indicated by symbol W in FIG. 15. That is, the cooling fan 27B draws external air into the interior of the motor housing 19B via the intake openings 47B. After cooling the electric motor 21B, the drawn air flows into the blade case 15B and also into the controller retaining compartment 48B as exhaust air.

The controller retaining compartment 48B is so formed as to define an appropriate space making it possible for air to flow through the controller 56B while retaining the controller 56B in position. The arrangement of the controller 56B retained within the controller retaining compartment 48B is determined as follows: That is, as shown in FIG. 15, the controller 56B is positioned within the controller retaining compartment 48B such that a front surface 56Ba of the controller 56B faces toward the radial direction (centrifugal direction) with respect to the cooling fan 27B. The front surface 56Ba is one of two opposite longer side surfaces (i.e., the most widely extending surfaces). Thus, the cooling air W blown by the cooling fan 27B may be applied to the controller 56B. Therefore, the longer side direction (the direction along the front surface 56Ba) of the controller 56B may be parallel to the direction in which the motor shaft 24B extends. In this way, the controller 56B is arranged in the passage of the exhaust air from the cooling fan 27B cooling the electric motor 21B. Further, the controller 56B is arranged in position such that a shorter side direction (thickness direction) of the controller 56B extends in parallel to the machining proceeding direction (forward and rearward direction). Furthermore, the controller 56B is arranged on the rear side, i.e., the side in the machining proceeding direction, of the electric motor 21B and on the front side, i.e., the side opposite to the machining proceeding direction, of the battery mounting portion 43B.

Also in the case of the cutting tool 11B of the second embodiment, it is possible to achieve the substantially the same effect as the first embodiment described above. That is, in the above-described cutting tool 11B, the controller 56B is disposed inside the tool main body 13B such that the front surface 56Ba extending in the longer side direction of the controller component 56B is positioned on the radially outer side, more specifically, the outer peripheral side in the centrifugal direction, of the cooling fan 27B. As a result, the exhaust air blown by the cooling fan 27B may be applied to the front surface 56Ba of the controller 56B, making it possible to achieve the effect of cooling the controller 56B by the exhaust air. Thus, it is possible to achieve a reduction in the size of the cutting tool 11B while making it possible to secure the cooling of the controller 56B by utilizing the cooling fan 27B. Further, in the above-described cutting tool 11B, the controller 56B is positioned such that the shorter side direction (thickness direction) of the controller 56B extends in parallel to the machining proceeding direction, so that it is possible to reduce the size of the space necessary for the controller 56B in the machining proceeding direction, making it possible for the cutting tool 11B to be one allowing easy machining operation. Further, in the above-described cutting tool 11B, the controller 56B is positioned on the rear side of the electric motor 21B and on the front side of the battery pack 60. As a result, it is possible to arrange the controller 56B by utilizing a space that has been left as a dead space in the conventional cutting tool, making it possible to achieve a reduction in size of the tool as a whole.

Third Embodiment

Figure 16:
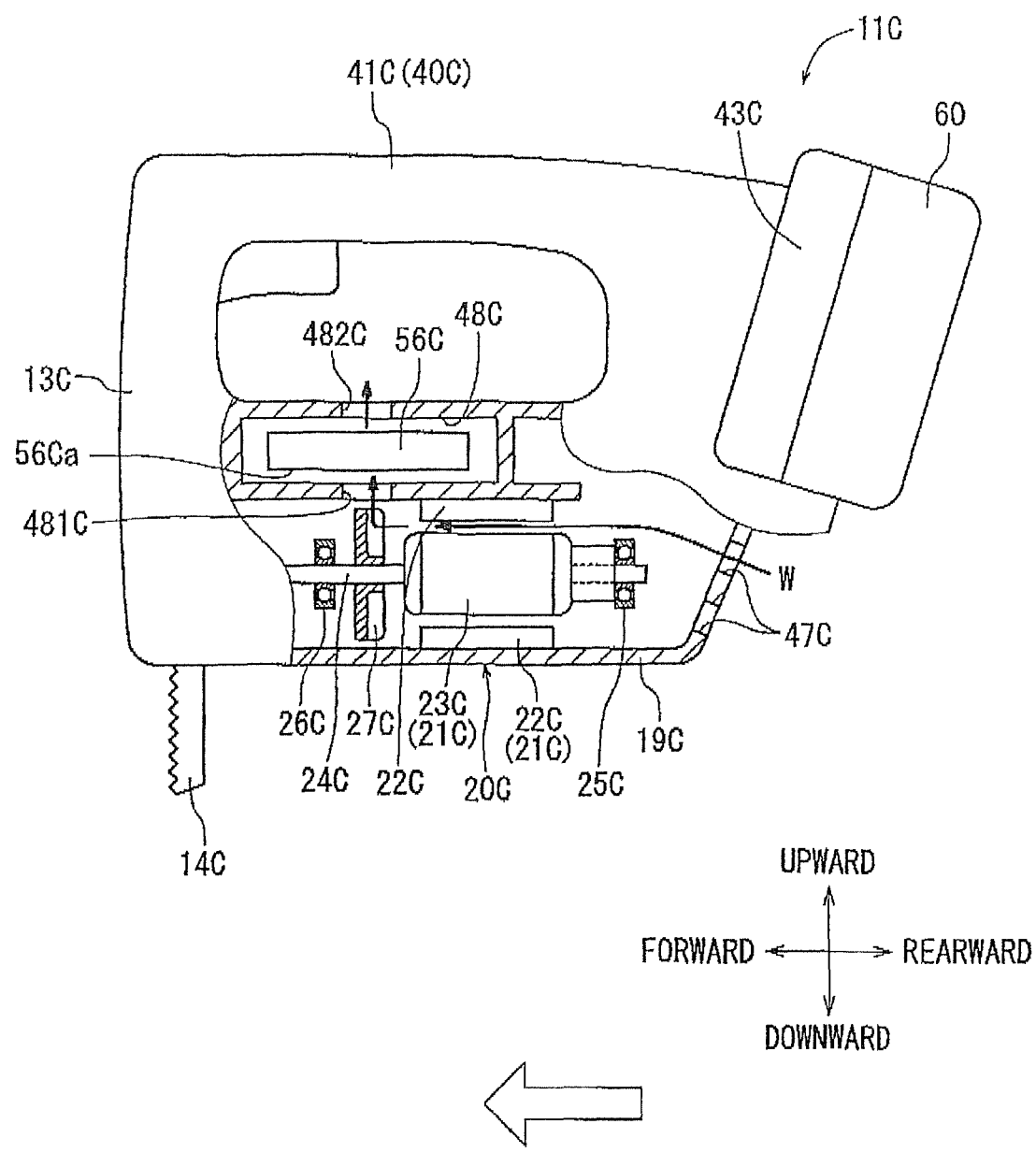
FIG. 16 is a schematic view, with a part broken away for showing the internal structure, of a cutting tool according to a third embodiment.

Next, a cutting tool 11C according to a third embodiment will be described with reference to FIG. 16. FIG. 16 schematically illustrates the cutting tool 11C according to the third embodiment. In particular, FIG. 16 schematically illustrates, with a part broken away, of the cutting tool 11C for showing an arrangement of an electric motor 21C and a controller 56C, and a structure allowing cooling of the controller 56C. In the description of the cutting tool 11C according to the third embodiment, the letter "A" at the end of the reference numerals used for the elements of the cutting tool 11A according to the first embodiment described above is replaced by the letter "C." As shown in FIG. 16, in the description of the cutting tool 11C according to the third embodiment, the side toward which the machining operation by the cutting tool 11C proceeds is referred to as the front side. The cutting tool 11C shown in FIG. 16 is a hand-held cutting tool (cutting machine) generally referred to as a jigsaw. That is, in the cutting tool 11C, the rotation of the electric motor 21C is converted into a reciprocal movement by a reciprocal movement conversion mechanism (not shown), so that a saw blade 14C reciprocates for cutting a workpiece. This saw blade 14C protrudes downwardly from a tool main body 13C. The saw blade 140 is caused to reciprocate through conversion by the reciprocal movement conversion mechanism, while the tool main body 13C of the cutting tool 11C is moved to slide on a workpiece to be cut, thereby performing a cutting operation. The cutting tool 11C may have a base (not shown) for placing on the workpiece to be cut, and the tool main body 13C may be supported by the base. In FIG. 16, numeral 41C indicates a handle portion to be grasped by the user. Further, numeral 43C indicates a battery mounting portion, to which the battery pack 60 is mounted as the power source.

The cutting tool 11C may have a housing 40C including the handle portion 41C and a motor housing 19C that are formed integrally with each other. The motor housing 19C may have a drive portion 20C. This drive portion 20C may include an electric motor 21C and the reciprocal movement conversion mechanism. The electric motor 21C may have a stator 22C and a rotor 23C and may have a motor shaft 24C that is rotatably driven. The reciprocal movement conversion mechanism may receive a rotational drive force from a pinion gear (not shown) mounted to the motor shaft 24C so as to reciprocate the saw blade 14C. This pinion gear may serve as a motor gear and is configured to transmit the rotational drive force generated by the electric motor 21C to a gear of the reciprocal movement conversion mechanism. The rear end (the right end as seen in FIG. 16) of the motor shaft 24C may be supported by a rear bearing 25C, and the front end (the left end as seen in the FIG. 16) thereof may be supported by a front bearing 26C. These bearings 25C and 26C are fixedly mounted within the motor housing 19C. Intake openings 47C may be formed in the rear end wall (the right end wall as seen in FIG. 16) of the motor housing 19C accommodating the electric motor 21C. The intake openings 47C formed in the rear end wall of the motor housing 19C may establish communication between the interior and the exterior of the motor housing 19C.

A cooling fan 27C may be mounted to the motor shaft 24C. More specifically, the cooling fan 27C is mounted to the motor shaft 24C at a position between the rotor 230 and the front bearing 260. The cooling fan 27C may be a centrifugal fan rotating together with the motor shaft 24C. The cooling fan 27C may draw air from the direction along the motor shaft 24C, and discharges it in the centrifugal direction. That is, as the cooling fan 27C rotates together with the motor shaft 240, external air is drawn into the tool main body 13C via the intake openings 47C to cool the electric motor 21C that may generate heat. The air may also cool the controller 56C disposed within a controller retaining compartment 48C described below.

The motor housing 19C may include the controller retaining compartment 48C formed integrally with the motor housing 19C and arranged so as to be adjacent to the upper side of the electric motor 21C. The controller 56C is retained within the controller retaining compartment 48C so as to be fixed in position. Also, similar to the controller 56 of the first embodiment, the controller 56C may have a package having various electrical components contained therein and supported by a base member (not shown). Further, like the controller 56 of the first embodiment, the controller 56C performs controls related to the rotation of the electric motor 21C. That is, this controller component 56C may include electric components serving as a regular control circuit for adjusting the electric power supplied to the electric motor 21C in a normal condition, and may also include electric components serving as an auto stop (AS) control circuit for automatically turning off the power source under a predetermined condition.

The controller retaining compartment 48C includes an interior communication hole 481C provided on the side where the electric motor 21C is arranged, and an exterior communication hole 482C provided on the side facing the exterior of the motor housing 19C. The interior communication hole 481C is arranged in correspondence with the position where the air flows from the cooling fan 27C. The exterior communication hole 482C is positioned on the side opposite to the internal communication hole 481C with respect to the controller 58C. Thus, the cooling air may flow from the cooling fan 27C as indicated by symbol W in FIG. 16. That is, the cooling fan 27C draws external air into the interior of the motor housing 19C via the intake openings 47C. After cooling the electric motor 21C, the drawn air may flow as a discharge air into the controller retaining compartment 48C.

The controller retaining compartment 48C is so formed as to define an appropriate space making it possible for air to flow through the controller 56C while retaining the controller 56C in position. The arrangement of the controller 56C retained within the controller retaining compartment 48C is determined as follows: That is, as shown in FIG. 16, the controller 56C is positioned within the controller retaining compartment 48C such that a lower surface 56Ca of the controller 56C faces in the radial direction (more specifically, toward the centrifugal direction) with respect to the cooling fan 27C. The lower surface 56Ca is one of opposite two longer side surfaces (the most widely extending surfaces). Thus, the cooling air W blown by the cooling fan 27C may be applied to the controller 56C. Therefore, the longer side direction (the direction along the lower surface 56Ca) of the controller 56C is parallel to the direction in which the motor shaft 24C extends. In this way, the controller 56C is arranged in the passage of the exhaust air from the cooling fan 27C cooling the electric motor 21C. Further, the controller 56C is arranged in position such that the longer side direction of the controller 56C is parallel to the machining proceeding direction (forward and rearward direction) and also parallel to the motor shaft 24C.

Also in the case of the cutting tool 11C of the third embodiment, it is possible to achieve the substantially the same effect as the first embodiment described above. That is, in the above-described cutting tool 11C, the controller 56C is disposed inside the tool main body 13C such that the lower surface 56Ca extending in an extending direction of the controller 56C is positioned on the radially outer side (more specifically, the outer peripheral side in the centrifugal direction) of the cooling fan 27C. As a result, the exhaust air blown by the cooling fan 27C may be applied to the lower surface 56Ca of the controller 56C, making it possible to achieve the effect of cooling the controller 56C by the exhaust air. Thus, it is possible to achieve a reduction in the size of the cutting tool 11C while making it possible to secure the cooling of the controller 56C by utilizing the cooling fan 27C. Further, in the above-described cutting tool 11C, the controller 56C is positioned such that the shorter side direction (thickness direction) of the controller 56C is parallel to the direction that the handle portion 41C is opposed to the workpiece, so that it is possible to minimize the height of the cutting tool 11C, making it possible for the cutting tool 11C to be one allowing easy machining operation. Further, in the above-described cutting tool 11C, the controller 56C is positioned on the lower side of the handle portion 410. As a result, it is possible to arrange the controller 56C by utilizing a space that has been left as a dead space in the conventional cutting tool, making it possible to achieve a reduction in size of the tool as a whole.

[Possible Modifications]

The above embodiments may be modified in various ways. For example, in the first embodiment, the output shaft 36 is rotatably supported by the three bearings 37, 381, and 382. However, the output shaft 36 may be supported by four or five or more bearings. Further, in the second embodiment, the output shaft 36 is rotatably supported by the outer side supporting bearing 38 including the two ball bearings 381 and 382, and by the inner side supporting bearing 37 that is a single needle bearing. It is possible to select appropriate types of bearings for these bearings. For example, all the bearings may be ball bearings. However, it is desirable for the bearing on the side where the machining tool is mounted to be a ball bearing that is small in size. Regarding the number of bearings arranged, it is not necessarily that the number of bearings is relatively large on the side where the machining too is mounted. It may be possible that the number of bearings arranged is relatively large on the side opposite the side where the machining tool is mounted. Further, while in the above-described embodiments the rotational speed of the electric motor is reduced in two stages (e.g., by the intermediate drive gear 31 and the output gear 35), it is also possible to reduce the rotational speed in three, four or more stages.

Further, the controller of each of the first to third embodiments is configured to perform, in addition to a regular control, a so-called auto stop (AS) control, in which the electric motor is forcibly turned off in the over-discharge state or the over-current state. However, the controller may perform any other controls as long as they are related to the rotational drive of the electric motor.

Further, while a portable circular saw, a slide table saw and a jigsaw have been described as examples of cutting tools, the present teachings may be also applicable to any other cutting tools, such as a chain saw, a disc grinder used to grind stone or the like, a trimmer for machining an end portion of a wooden workpiece or the like, and a router for grooving a wooden workpiece or the like.

What is claimed is:

1. An electric tool comprising:
a tool main body configured to be able to mount a battery pack, the tool main body including:
an electric motor configured to rotate with a supply of an electric power from the battery pack;
a centrifugal fan rotatably driven by the electric motor for producing a flow of air;
a controller configured to control the electric motor with respect to a rotational drive of the electric motor; and
a cutting blade rotatably driven by the electric motor, the cutting blade extending parallel to the radial direction of the centrifugal fan,
wherein the controller is disposed within the tool main body such that at least a part of a surface of the controller is positioned on a radially outer side of the centrifugal fan,
wherein the surface of the controller includes a longer side surface and a shorter side surface, the longer side surface is positioned on a radially outer side of the centrifugal fan, and the longer side surface ends in a vertical direction in parallel to a rotational axis of the centrifugal fan,
wherein the longer side surface includes two opposite longer side surfaces and the shorter side surface includes four or more shorter side surfaces connecting between the opposite longer side surfaces, and one of the opposite longer side surfaces directly opposes the centrifugal fan on the radially outer side, and
wherein the at least a part of the controller is positioned on a rear side of the centrifugal fan with respect to a machining proceeding direction so as to directly oppose the centrifugal fan on the radially outer side.

2. The electric tool according to claim 1, wherein the electric tool is a hand-held electric tool, and the tool main body further includes a handle portion configured to be grasped by a user, so that the electric tool can be operated while the user supports the electric tool by grasping the handle portion.

3. The electric tool according to claim 1, wherein the controller is positioned on a rear side of the electric motor with respect to a machining proceeding direction.

4. The electric tool according to claim 1, wherein the controller is fixed in position within the tool main body with the shorter side surface of the controller being positioned to extend along a tool machining proceeding direction.

5. The electric tool according to claim 1, wherein the tool main body further includes a battery mounting portion to which the battery pack is removably mounted, and the controller is positioned on a front side of the battery mounting portion with respect to a machining proceeding direction.

6. The electric tool according to claim 1, wherein the tool main body further includes a controller retaining compartment configured to retain the controller therein and to allow air blown from the centrifugal fan to flow therethrough.

7. The electric tool according to claim 6, wherein the controller retaining compartment includes a communication opening and a discharge opening, the communication opening communicating between inside of the tool main body and the inside of the controller retaining compartment, and the discharge opening communicating between the inside of the controller retaining compartment and the outside of the tool main body.

8. An electric tool comprising:
a tool main body configured to be able to mount a battery pack, the tool main body including:
an electric motor configured to rotate with a supply of an electric power from the battery pack;
a controller configured to control the electric motor;
a centrifugal fan rotatably driven by the electric motor for producing a flow of air; and
a cutting blade rotatably driven by the electric motor, the cutting blade extending parallel to the radial direction of the centrifugal fan,
wherein the controller is positioned such that the flow of air produced by the centrifugal fan is applied to at least a part of the controller,
wherein the surface of the controller includes a longer side surface and a shorter side surface, the longer side surface is positioned on a radially outer side of the centrifugal fan, and the longer side surface extends in a vertical direction in parallel to a rotational axis of the centrifugal fan,
wherein the longer side surface includes two opposite longer side surfaces and the shorter side surfaces includes four or more shorter side surfaces connecting between the opposite longer side surfaces, and one of the opposite longer side surfaces directly opposes the centrifugal fan on the radially outer side, and
wherein at least a part of the controller is positioned on a rear side of the centrifugal fan with respect to a machining proceeding direction so as to directly oppose the centrifugal fan on the radially outer side.

9. The electric tool according to claim 8, wherein:
the controller is positioned on a radially outer side of the centrifugal fan.

* * * * *